United States Patent
Shi et al.

(10) Patent No.: US 11,418,114 B2
(45) Date of Patent: Aug. 16, 2022

(54) BOOST POWER CONVERSION CIRCUIT, METHOD, INVERTER, APPARATUS, AND SYSTEM

(71) Applicant: Huawei Digital Power Technologies Co., Ltd., Shenzhen (CN)

(72) Inventors: Tao Shi, Shanghai (CN); Jixin Zhu, Dongguan (CN)

(73) Assignee: HUAWEI DIGITAL POWER TECHNOLOGIES CO., LTD., Guangdong (CN)

(*) Notice: Subject to any disclaimer, the term of this patent is extended or adjusted under 35 U.S.C. 154(b) by 13 days.

(21) Appl. No.: 16/938,119

(22) Filed: Jul. 24, 2020

(65) Prior Publication Data

US 2020/0358356 A1 Nov. 12, 2020

Related U.S. Application Data

(63) Continuation of application No. PCT/CN2019/115075, filed on Nov. 1, 2019.

(30) Foreign Application Priority Data

Dec. 21, 2018 (CN) .......................... 201811573498.5

(51) Int. Cl.
*H02M 3/158* (2006.01)
*H02M 7/483* (2007.01)
(Continued)

(52) U.S. Cl.
CPC .......... *H02M 3/158* (2013.01); *H02M 7/4837* (2021.05); *H02M 1/0095* (2021.05);
(Continued)

(58) Field of Classification Search
CPC ........ H02M 1/32; H02M 1/36; H02M 1/0095; H02M 3/07–078; H02M 3/156–1588; H02M 7/483; H02M 7/4837
See application file for complete search history.

(56) References Cited

U.S. PATENT DOCUMENTS

2010/0289423 A1* 11/2010 Yao ..................... H02M 3/1582
315/246
2012/0182775 A1 7/2012 Tan et al.
(Continued)

FOREIGN PATENT DOCUMENTS

CN 1182392 A 5/1998
CN 202231930 U 5/2012
(Continued)

*Primary Examiner* — Fred E Finch, III
(74) *Attorney, Agent, or Firm* — Womble Bond Dickinson (US) LLP

(57) ABSTRACT

This application discloses a boost power conversion circuit, a method, an inverter, an apparatus, and a system. In the conversion circuit, a voltage control circuit is added on a three-level boost. The voltage control circuit can be connected in series in a third closed loop, and the third closed loop is a loop including an inductor, a first switching transistor, a flying capacitor, a second diode, and an input end. The voltage control circuit clamps a voltage of a common point of the first diode and the second diode when a voltage on an input end of the boost power conversion circuit is less than a startup voltage of the boost power conversion circuit. The voltage borne by the second diode is reduced, so that a diode with relatively small voltage stress can be selected.

18 Claims, 12 Drawing Sheets

(51) Int. Cl.
  *H02M 1/32* (2007.01)
  *H02M 1/36* (2007.01)
  *H02M 3/07* (2006.01)
  *H02M 1/00* (2006.01)

(52) U.S. Cl.
  CPC ............... *H02M 1/32* (2013.01); *H02M 1/36* (2013.01); *H02M 3/07* (2013.01)

(56) References Cited

U.S. PATENT DOCUMENTS

| | | | |
|---|---|---|---|
| 2015/0171750 A1 | 6/2015 | Zeng et al. | |
| 2015/0333522 A1* | 11/2015 | Wang | H02M 7/537 307/43 |
| 2018/0115243 A1* | 4/2018 | Fu | H02M 3/158 |
| 2018/0219492 A1* | 8/2018 | Shi | H02M 7/483 |
| 2018/0241320 A1* | 8/2018 | Wang | H02M 7/483 |
| 2018/0309383 A1* | 10/2018 | Wang | H02M 7/5387 |
| 2019/0068076 A1* | 2/2019 | Uda | H02M 1/36 |
| 2019/0214904 A1* | 7/2019 | Yu | H02M 3/158 |
| 2020/0076301 A1* | 3/2020 | Zhuang | H02M 1/32 |
| 2020/0076302 A1* | 3/2020 | Zhuang | H02M 1/36 |
| 2020/0328674 A1* | 10/2020 | Yu | H02M 3/158 |

FOREIGN PATENT DOCUMENTS

| | | |
|---|---|---|
| CN | 102771039 A | 11/2012 |
| CN | 106230253 A | 12/2016 |
| CN | 107070215 A | 8/2017 |
| CN | 206370772 U | 8/2017 |
| CN | 107677877 A | 2/2018 |
| CN | 108258899 A | 7/2018 |
| CN | 108847769 A | 11/2018 |
| CN | 108923632 A | 11/2018 |
| CN | 108988635 A | 12/2018 |
| CN | 109039061 A | 12/2018 |
| CN | 109756115 A | 5/2019 |
| DE | 102014109048 A1 | 12/2015 |
| EP | 3439158 A1 | 2/2019 |
| EP | 3618253 A1 | 3/2020 |
| WO | 2018069960 A1 | 4/2018 |

\* cited by examiner

BOOST POWER CONVERSION CIRCUIT, METHOD, INVERTER, APPARATUS, AND SYSTEM

CROSS-REFERENCE TO RELATED APPLICATIONS

This application is a continuation of International Application No. PCT/CN2019/115075, filed on Nov. 1, 2019, which claims priority to Chinese Patent Application No. 201811573498.5, filed on Dec. 21, 2018. The disclosures of the aforementioned applications are hereby incorporated by reference in their entireties.

TECHNICAL FIELD

The present invention relates to the field of power electronics technologies, and in particular, to a boost power conversion circuit, a method, an inverter, an apparatus, and a system.

BACKGROUND

A boost circuit is a boost power conversion circuit, and can boost and then output an input voltage, to convert power. The boost circuit includes a two-level boost circuit and a multi-level boost circuit. The two-level boost circuit is usually used in scenarios with a relatively low voltage level, and the two-level boost circuit has two input levels. The multi-level boost circuit is used in scenarios with a higher voltage level, and the multi-level boost circuit can convert power for an input level that is greater than or equal to three levels.

Compared with the two-level boost circuit, the multi-level boost circuit implements a plurality of levels by improving a topological structure of the multi-level boost circuit, to output a high voltage and large power. For a same input voltage, a prominent advantage of the multi-level boost circuit is that the multi-level boost circuit can reduce voltage stress of a power component. The voltage stress borne by the power component is half that of the two-level boost circuit, so that a power component with a relatively low voltage withstand level can be used to implement voltage output with a relatively high level. In addition, due to different modulation schemes, the multi-level boost circuit has smaller input current ripples than the two-level boost circuit, so that a volume and design costs of a filter are reduced. Therefore, the multi-level boost circuit has a broad application prospect.

Application of the multi-level boost circuit is described below by using the photovoltaic power generation field as an example.

To improve power generation efficiency of a photovoltaic component, an output end of the photovoltaic component is connected to an input end of the multi-level boost circuit, and output ends of a plurality of multi-level boost circuits are connected in parallel to control the connected photovoltaic component, so that the photovoltaic component can output relatively large power.

However, when the plurality of boost circuits are connected in parallel, an input end of a specific boost circuit may not be connected to the photovoltaic component, and consequently a voltage is less than a startup voltage of the boost power conversion circuit. In this case, input ends of other boost circuits are connected to an input source, and therefore, if a bus voltage is set on output ends of all boost circuits, a power component in a boost circuit whose voltage is lower than the startup voltage of the boost power conversion circuit bears the bus voltage. Therefore, a diode in the boost circuit needs to be of a type whose voltage stress can bear the bus voltage. Consequently, it is difficult to select a type of the diode, and in addition, higher voltage stress leads to higher component costs.

SUMMARY

To resolve the foregoing technical problems in the prior art, embodiments of the present invention provides a boost power conversion circuit, a method, an inverter, an apparatus, and a system, so that when a voltage on an input end of the boost power conversion circuit is less than a startup voltage of the boost power conversion circuit, a voltage borne by a diode in the boost circuit can be reduced, and a diode with relatively small voltage stress can be selected.

According to a first aspect, an embodiment of this application provides a boost power conversion circuit, and a voltage control circuit is added based on a three-level boost circuit. The boost power conversion circuit includes a first switching transistor, a second switching transistor, an inductor, a flying capacitor, a first diode, a second diode, and a voltage control circuit. The inductor, the first diode, and the second diode are successively connected in series to form a first branch, the first branch is connected in series to an input positive electrode and an input negative electrode of the boost power conversion circuit to form a main circuit, both an anode of the first diode and an anode of the second diode are close to the input positive electrode of the boost power conversion circuit, and both a cathode of the first diode and a cathode of the second diode are close to the input negative electrode of the boost power conversion circuit. The inductor, the first switching transistor, and the second switching transistor are connected in series to form a first closed loop, and the first switching transistor, the second switching transistor, the first diode, and the second diode form a second closed loop. One end of the flying capacitor is connected to a common point of the first diode and the second diode, and the other end of the flying capacitor is connected to a common point of the first switching transistor and the second switching transistor. The voltage control circuit is connected in series in a third closed loop, and the third closed loop is a loop including the inductor, the first switching transistor, the flying capacitor, the second diode, the input positive electrode, and the input negative electrode. The voltage control circuit is configured to make a voltage borne by the second diode less than a bus voltage of the boost power conversion circuit, and the bus voltage is a voltage difference between a positive bus voltage and a negative bus voltage; or a first end of the voltage control circuit is connected to a common end of the first diode and the second diode, a second end of the voltage control circuit is connected to a reference point, the reference point is used to provide a clamping potential, and the clamping potential is between a negative bus potential and a positive bus potential. The voltage control circuit is configured to clamp a voltage of the common point of the first diode and the second diode when a voltage on an input end of the boost power conversion circuit is less than a startup voltage of the boost power conversion circuit.

The added voltage control circuit can clamp the voltage of the common point of the first diode and the second diode, and make, when the voltage on the input end of the boost power conversion circuit is less than the startup voltage of the boost power conversion circuit, a voltage borne by the common point of the first diode and the second diode less than the bus voltage, so that voltage stress borne by the common point of the first diode and the second diode can be reduced, and selection of a diode type is facilitated. Costs of a diode are directly proportional to voltage stress borne by the diode, and higher voltage stress that the diode can bear leads to higher costs.

In one embodiment, the voltage control circuit can be connected in series in the third closed loop, to divide a voltage of the second diode, thereby reducing voltage stress borne by the second diode. The voltage control circuit includes one of a clamping diode, a controllable switching transistor, and a compound component, and the compound component includes the clamping diode and the controllable switching transistor that are connected in parallel.

In one embodiment, because when the voltage control circuit includes the controllable switching transistor or the compound component, there is the controllable switching transistor, and because the controllable switching transistor cannot automatically perform actions, a controller is required to control an on/off state of the controllable switching transistor, in other words, whether the controllable switching transistor is closed or open. The voltage control circuit can further include a controller. The controller can be configured to: when the voltage on the input end of the boost power conversion circuit is less than the startup voltage of the boost power conversion circuit, control to open the controllable switching transistor. The controller can be further configured to: when the voltage on the input end of the boost power conversion circuit is greater than the startup voltage of the boost power conversion circuit, control to close the controllable switching transistor.

In one embodiment, when the voltage control circuit includes a clamping diode, the clamping diode can automatically perform actions, in other words, has features of being forward conductive and reversely cut off. Therefore, the controller is not required to control an on/off state of the clamping diode. To better divide the voltage of the second diode, a resistor is used to enforce voltage division. In this case, the voltage control circuit may further include a first resistor and a second resistor. The first resistor is connected in parallel between two ends of the clamping diode, and the second resistor is connected in parallel between two ends of the second diode.

In one embodiment, when the voltage control circuit includes the compound component, the voltage control circuit further includes a first resistor and a second resistor. The first resistor is connected in parallel between two ends of the clamping diode, and the second resistor is connected in parallel between two ends of the second diode.

In one embodiment, when the voltage control circuit includes the controllable switching transistor, to better divide the voltage of the second diode, a resistor is used to enforce voltage division. The voltage control circuit further includes a controller, a first resistor, and a second resistor. The controllable switching transistor is connected in series between the first diode and the second diode, the first resistor is connected in parallel between two ends of the controllable switching transistor, and the second resistor is connected in parallel between two ends of the second diode.

In one embodiment, to reduce costs and reduce a circuit size, an existing resource in a current boost can be effectively used to provide a clamping potential of the reference point. For example, a bus capacitor is used to provide the clamping potential. In other words, the boost further includes a first bus capacitor and a second bus capacitor. The first switching transistor, the second switching transistor, the first diode, the second diode, the first bus capacitor, and the second bus capacitor form a second closed loop. The reference point is a common point of the first bus capacitor and the second bus capacitor. When a capacitance of the first bus capacitor is equal to a capacitance of the second bus capacitor, a voltage of the clamping potential is ½ of the bus voltage.

In one embodiment, to reduce costs and reduce a circuit size, an existing resource in a current boost can be effectively used to provide a clamping potential of the reference point. For example, a bus capacitor is used to provide the clamping potential. In other words, the boost may further include the following four bus capacitors: a first bus capacitor, a second bus capacitor, a third bus capacitor, and a fourth bus capacitor. The first switching transistor, the second switching transistor, the first diode, the second diode, the first bus capacitor, the second bus capacitor, the third bus capacitor, and the fourth bus capacitor can form a second closed loop. The reference point is any common point between the first bus capacitor, the second bus capacitor, the third bus capacitor, and the fourth bus capacitor. When capacitances of the first bus capacitor, the second bus capacitor, the third bus capacitor, and the fourth bus capacitor are all equal, locations of reference points are different, and therefore corresponding clamping potentials are different. For example, when a common point of the first bus capacitor and the second bus capacitor is connected, a voltage of the clamping potential is ¼ of the bus voltage.

In one embodiment, when one end of the voltage control circuit is connected to the reference point, the voltage control circuit may specifically include a third switching transistor and a controller. The controller is used to control an on/off state of the third switching transistor. When clamping is required, the third switching transistor is controlled to be closed. When clamping is not required, the third switching transistor is controlled to be opened, in other words, the voltage control circuit loses effect. Specifically, a first end of the third switching transistor is connected to the common end of the first diode and the second diode, and a second end of the third switching transistor is connected to the reference point. The controller is configured to: when the voltage on the input end of the boost power conversion circuit is less than the startup voltage of the boost power conversion circuit, control to close the third switching transistor. The controller is further configured to: when the voltage on the input end of the boost power conversion circuit is greater than the startup voltage of the boost power conversion circuit, control to open the third switching transistor.

In one embodiment, when one end of the voltage control circuit is connected to the reference point, the voltage control circuit may specifically include a diode. When clamping is required, the diode plays a conduction role, and when clamping is not required, inverse cut-off of the diode does not work. Specifically, the voltage control circuit includes a third diode. A cathode of the third diode is connected to the common point of the first diode and the second diode, and an anode of the third diode is connected to the reference point.

In one embodiment, the first branch may be close to an end of the input positive electrode, which is specifically: a first end of the inductor is connected to the input positive electrode, and a second end of the inductor is connected to the first diode and the second diode that are successively connected in series.

In one embodiment, the first branch may be close to an end of the input negative electrode, which is specifically: a first end of the inductor is connected to the input negative electrode, and a second end of the inductor is connected to the first diode and the second diode that are successively connected in series.

According to a second aspect, an embodiment of this application further provides a boost power conversion circuit control method, applied to the foregoing boost power conversion circuit. The method includes: when it is determined that a voltage on an input end of the boost power conversion circuit is less than a startup voltage of the boost power conversion circuit, making, by a voltage control circuit, a voltage borne by a second diode less than a bus voltage of the boost power conversion circuit, where the bus voltage is a voltage difference between a positive bus voltage and a negative bus voltage. When the voltage on the input end of the boost power conversion circuit is less than the startup voltage of the boost power conversion circuit, a voltage borne by a common point of a first diode and the second diode is made less than the bus voltage, so that voltage stress borne by the common point of the first diode and the second diode can be reduced, and selection of a diode type is facilitated. Costs of a diode are directly proportional to voltage stress borne by the diode, and higher voltage stress that the diode can bear leads to higher costs.

According to a third aspect, an embodiment of this application further provides an inverter. The inverter includes two levels of circuits. One level is the foregoing boost power conversion circuit, that is, direct current-direct current (DC-DC). The other level is an inverter circuit, that is, direct current-alternating current (DC-AC). The inverter is used in the photovoltaic power generation field, to be specific, an input end of the boost power conversion circuit is connected to a photovoltaic component, to boost and then output an output voltage of the photovoltaic component to an input end of the inverter circuit, and the inverter circuit inverts, into an alternating current, a direct current output by the boost power conversion circuit and provides the alternating current to a subsequent-level circuit. The subsequent-level circuit may be an alternating-current power network or alternating-current load.

According to a fourth aspect, an embodiment of this application further provides a photovoltaic power generation apparatus, including the foregoing photovoltaic component and the foregoing boost power conversion circuit. The boost power conversion circuit is in one-to-one correspondence with the photovoltaic component. An input end of the boost power conversion circuit is connected to the photovoltaic component. The boost power conversion circuit is configured to boost and then output an output voltage of the connected photovoltaic component to a subsequent-level circuit. When a voltage on an input end of the boost power conversion circuit is less than a startup voltage of the boost power conversion circuit, a voltage borne by a common point of a first diode and a second diode is made less than a bus voltage, so that voltage stress borne by the common point of the first diode and the second diode can be reduced, and selection of a diode type is facilitated.

According to a fifth aspect, an embodiment of this application further provides a photovoltaic power generation system, including at least two photovoltaic power generation apparatuses described above. Output ends of boost power conversion circuits in the at least two photovoltaic power generation apparatuses are connected in parallel. When a voltage on an input end of a boost power conversion circuit in one of the photovoltaic power generation apparatuses is less than a startup voltage of the boost power conversion circuit, a diode of the boost power conversion circuit bears a back voltage of a bus voltage of another boost power conversion circuit connected in parallel to the boost power conversion circuit. Therefore, a voltage control circuit can be used to clamp a voltage for a diode, so that the diode bears less voltage stress than the bus voltage, and selection of a diode type is facilitated.

Compared with the prior art, embodiments of the present invention have at least the following advantages:

The boost power conversion circuit can include a voltage control circuit, the boost power conversion circuit can include a first diode and a second diode that are connected in series, and both the first diode and the second diode are freewheeling diodes. When a voltage on an input end of the boost power conversion circuit is less than a startup voltage of the boost power conversion circuit, but there is a bus voltage on an output end of the boost power conversion circuit, the first diode and the second diode bear a bus voltage in a reverse direction. Therefore, a voltage of a common point of the first diode and the second diode needs to be clamped. The voltage control circuit added in the embodiments of this application can clamp the voltage of the common point of the first diode and the second diode, and when the voltage on the input end of the boost power conversion circuit is less than the startup voltage of the boost power conversion circuit, the voltage borne by the common point of the first diode and the second diode is made less than the bus voltage, so that voltage stress borne by the common point of the first diode and the second diode can be reduced, and selection of a diode type is facilitated.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following descriptions show some embodiments of this application, and a person of ordinary skill in the art may still derive other drawings from these accompanying drawings without creative efforts.

DESCRIPTION OF EMBODIMENTS

To make a person skilled in the art better understand technical solutions provided in embodiments of this application, a working principle of a multi-level boost circuit is described below by using an example in which the multi-level boost circuit is a three-level boost circuit.

Figure 1:
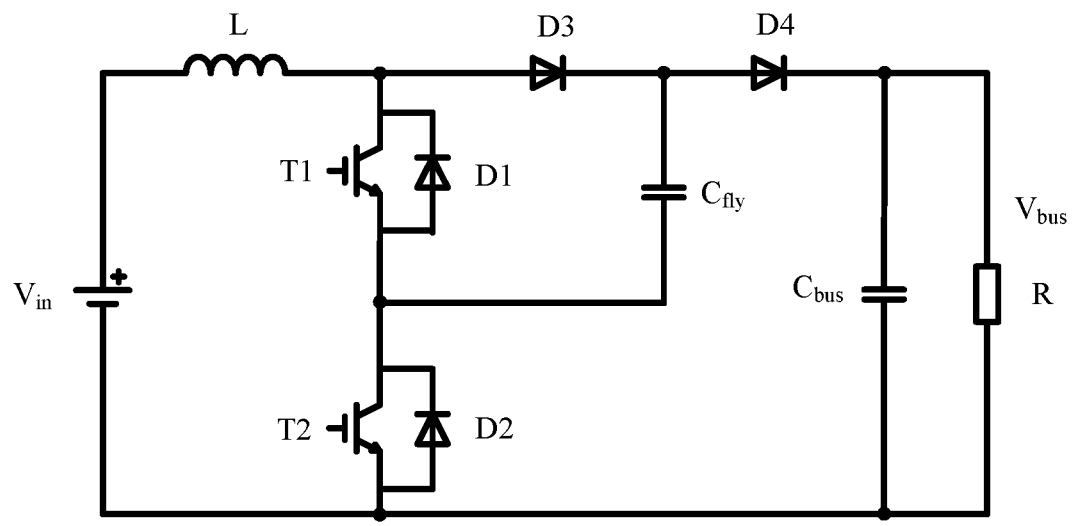
FIG. 1 is a topological structure diagram of a three-level boost circuit.

FIG. 1 is a topological structure diagram of a three-level boost circuit.

The three-level boost circuit includes a flying capacitor $C_{fly}$, $V_{in}$ is an input voltage, and $V_{bus}$ is a bus voltage on an output side of the boost circuit, in other words, an output voltage. Both T1 and T2 are switching transistors. D1 and D2 are respectively diodes that are inversely connected in parallel to T1 and T2. D3 and D4 are freewheeling diodes. L is an inductor. $C_{bus}$ is a bus capacitor on the output side of the boost circuit.

Based on a relationship between the input voltage Vin and the output voltage $C_{bus}$, the boost circuit separately works in a working mode in which a duty cycle D is less than 0.5 and a working mode in which a duty cycle D is greater than 0.5. When $V_{in}$>0.5Vbus, the duty cycle D is less than 0.5. When $V_{in}$<0.5$V_{bus}$, the duty cycle D is greater than 0.5. On/off states are different in the two modes. Working principles of the two modes are separately described below.

(1) D<0.5

Figure 2:
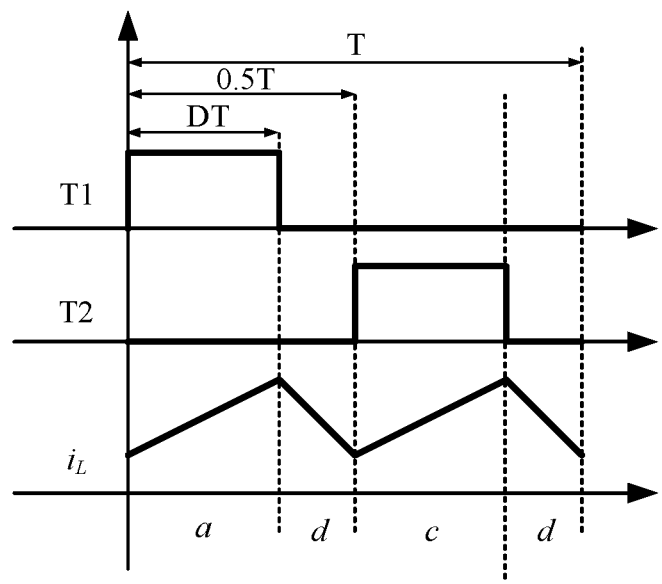
FIG. 2 is a waveform graph of a drive signal when D<0.5.

When $V_{in}$>0.5$V_{bus}$, the duty cycle D is less than 0.5. When D<0.5, a waveform graph of a drive signal is shown in FIG. 2, and a current flowing path in each switching mode is shown FIG. 3 to FIG. 6, where a solid line represents a current path.

T is a switching period, and drive signals of T1 and T2 differ by a phase angle of 180 degrees.

Figure 3:
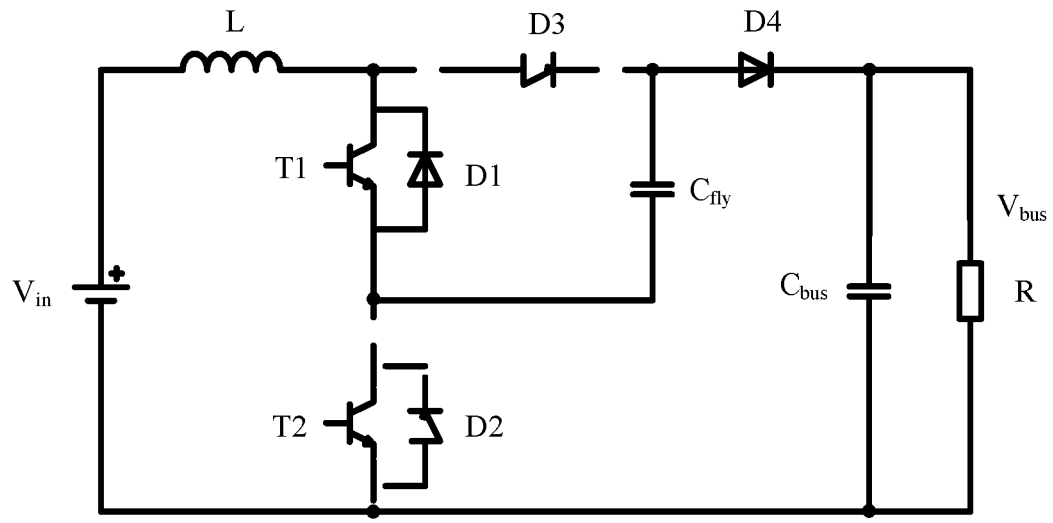
FIG. 3 is a path graph of a switching mode a when D<0.5.

As shown in FIG. 3, when D<0.5, in a switching mode a, T1 is on, T2 is off, D4 is conducted, and D3 is cut off. Because a voltage $V_{Cfly}$ of the flying capacitor is controlled to be 0.5$V_{bus}$, a voltage $V_{in}$ borne by two ends of the inductor L minus 0.5$V_{bus}$ is greater than 0.5$V_{bus}$, and a current of the inductor linearly increases. In this case, voltage stress of D3 is 0.5$V_{bus}$, the diode D4 is conducted, and there is no inverse voltage stress.

Figure 4:
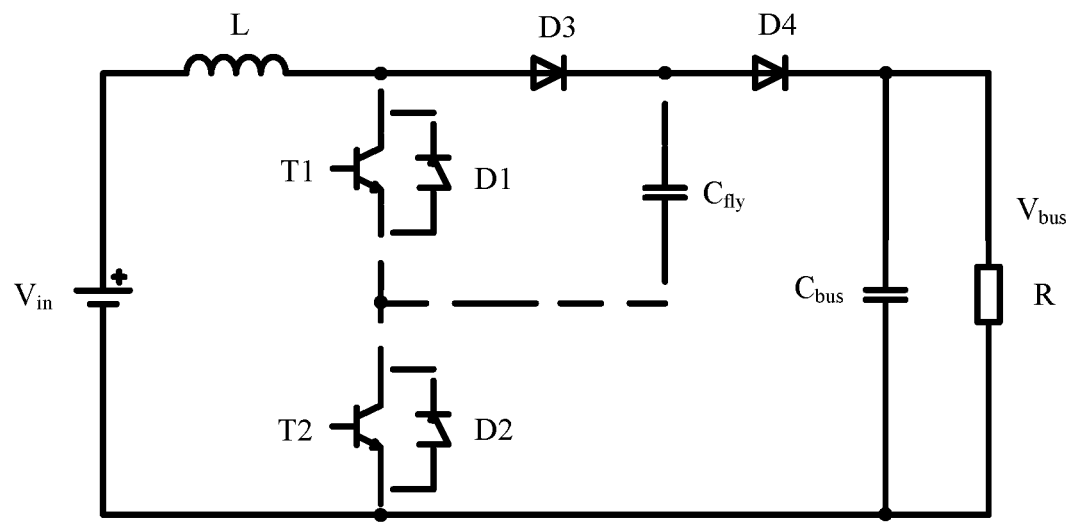
FIG. 4 is a path graph of a switching mode b when D<0.5.
Figure 6:
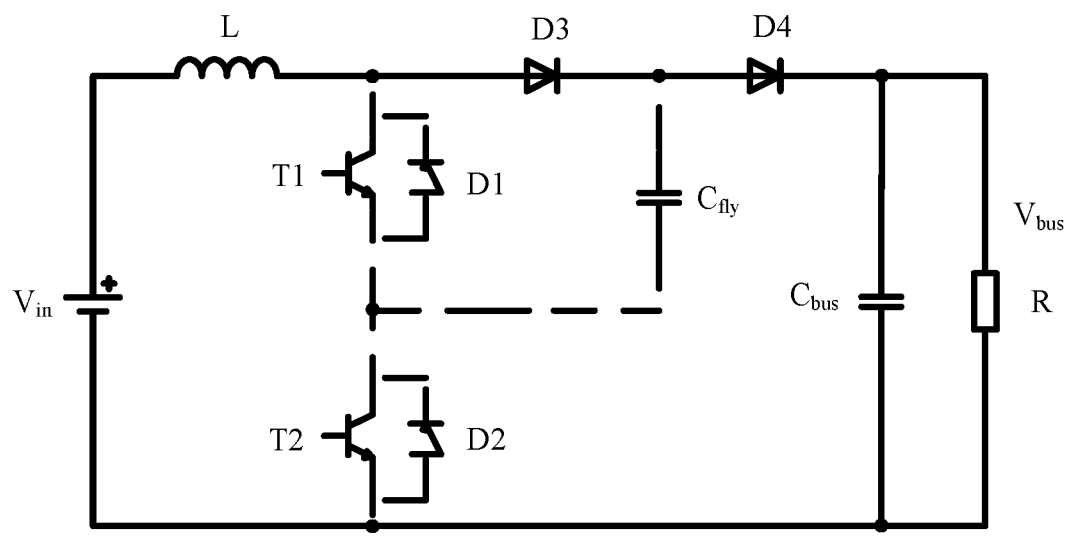
FIG. 6 is a path graph of a switching mode d when D<0.5.

As shown in FIG. 4 and FIG. 6, when D<0.5, switching modes b and d are totally the same, and appear twice in a same period. Both T1 and T2 are in an off state. A current of the inductor freewheels by using D3 and D4. D3 and D4 are conducted, and there is no inverse voltage stress.

Figure 5:
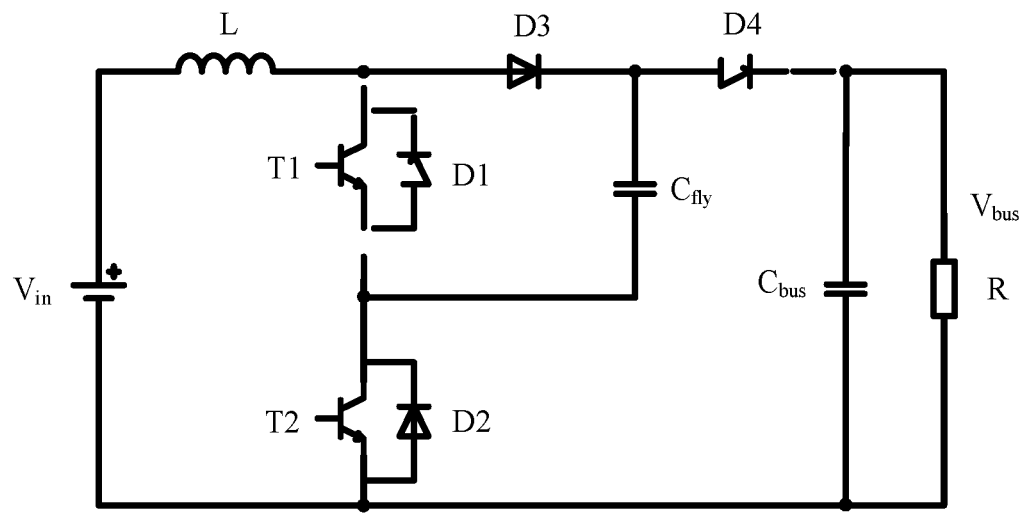
FIG. 5 is a path graph of a switching mode c when D<0.5.

As shown in FIG. 5, when D<0.5, in a switching mode c, T1 is off, T2 is on, D3 is conducted, and D4 is cut off. Voltage stress of D4 is $V_{bus}$-$V_{Cfly}$=0.5$V_{bus}$. According to a voltage-second balance principle for two ends of the inductor, to be specific, in one working period, a product of time and a voltage between two ends of the inductor is 0, it can be learned that $$(V_{in}-V_{bus}+V_{Cfly})\cdot DT+(V_{in}-V_{bus})\cdot(1-2D)T+(V_{in}-V_{Cfly})\cdot DT=0$$

It can be learned by simplifying the formula that $$V_{bus} = \frac{V_{in}}{1-D},$$

and an output voltage can be controlled by controlling the duty cycles of T1 and T2.

(2) D>0.5

Figure 7:
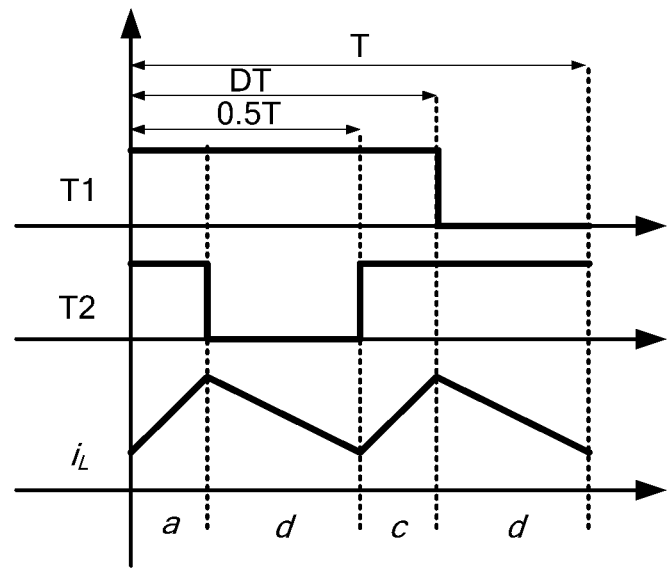
FIG. 7 is a waveform graph of a drive signal when D<0.5.

When $V_{in}$<0.5$V_{bus}$, the duty cycle D is greater than 0.5. When D>0.5, a waveform graph of a drive signal is shown in FIG. 7. When D>0.5, a current flowing path in each switching mode is shown in FIG. 8 to FIG. 11, where a solid line represents a current path.

Figure 8:
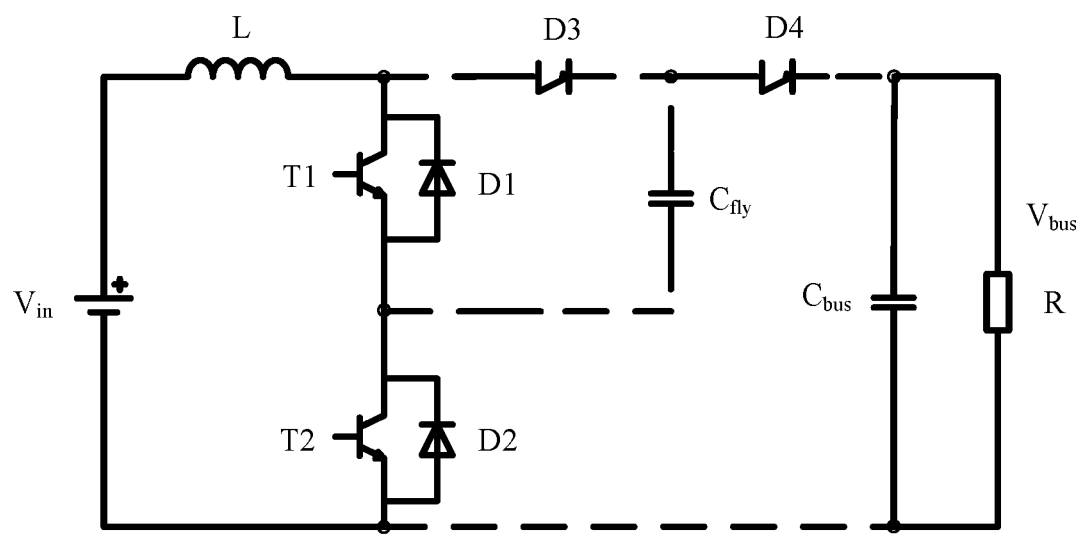
FIG. 8 is a path graph of a switching mode a when D>0.5.
Figure 10:
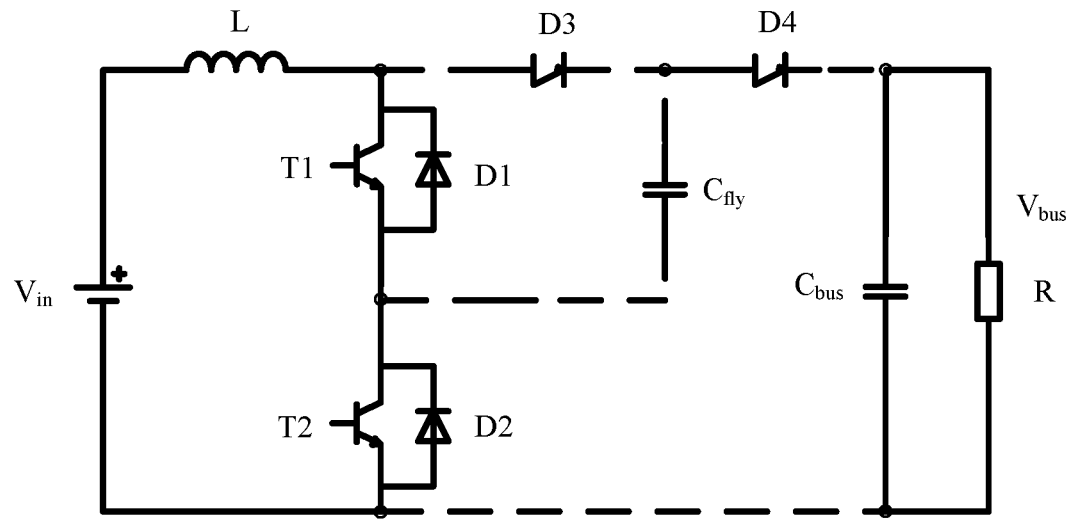
FIG. 10 is a path graph of a switching mode c when D>0.5.

As shown in FIG. 8 and FIG. 10, when D>0.5, current flowing paths in switching modes a and c are totally the same, and the two switching modes appear in different phases of one period. T1 and T2 are conducted, and D3 and D4 are cut off. A voltage between two ends of the inductor L is $V_{in}$, and a current of the inductor linearly increases. Both voltage stress of D3 and voltage stress of D4 are 0.5$V_{bus}$.

Figure 9:
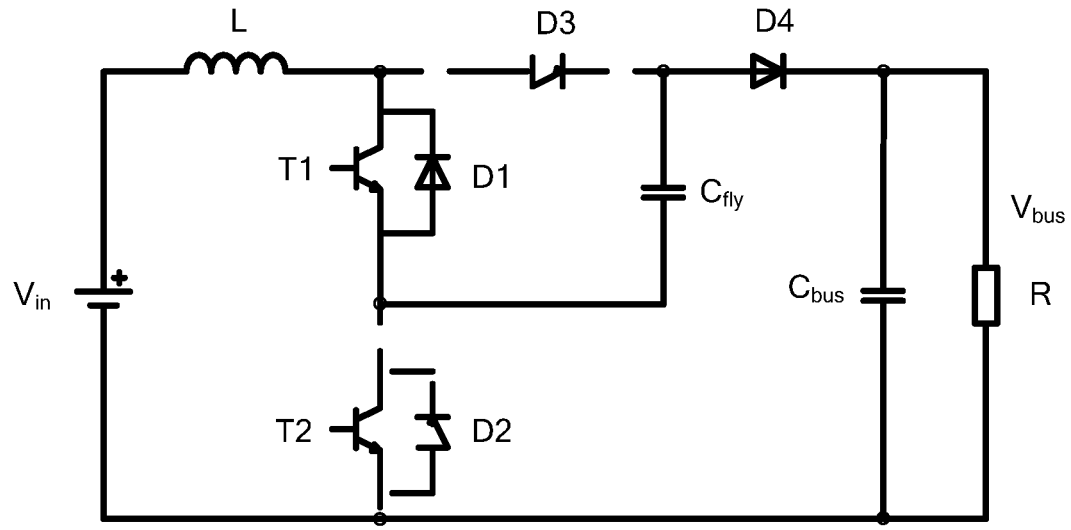
FIG. 9 is a path graph of a switching mode b when D>0.5.

As shown in FIG. 9, when D>0.5, in a switching mode b, T1 is on, T2 is off, D4 is conducted, and D3 is cut off. Voltage stress of D3 is 0.5$V_{bus}$.

Figure 11:
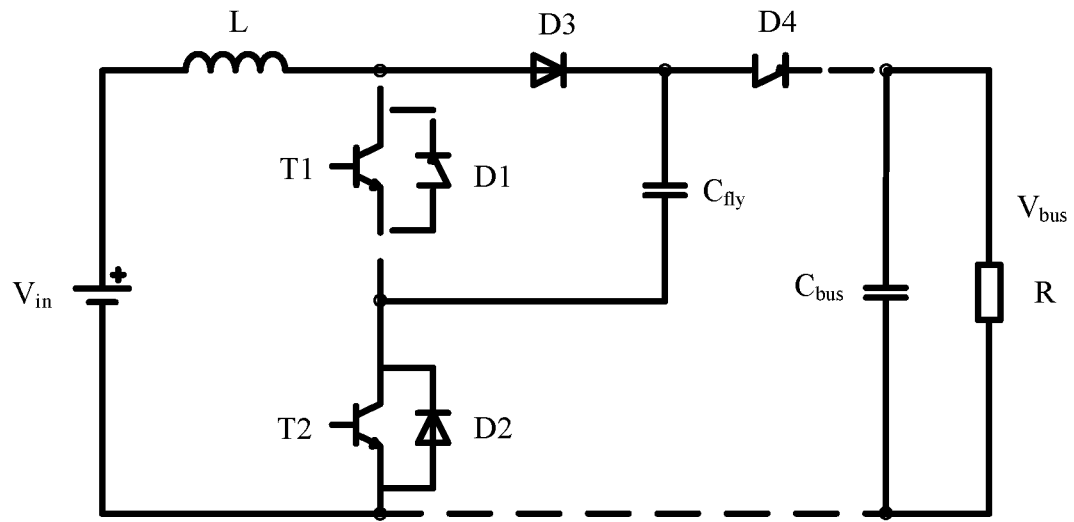
FIG. 11 is a path graph of a switching mode d when D>0.5.

As shown in FIG. 11, when D>0.5, in a switching mode d, D2 is on, D1 is off, D3 is conducted, and D4 is cut off. Voltage stress of D4 is 0.5$V_{bus}$.

Similarly, it can be learned according to a voltage-second balance principle for two ends of the inductor that $$V_{bus} = \frac{V_{in}}{1-D}.$$

It can be learned from the foregoing analysis that, in various working modes in steady states, both voltage stress of D3 and voltage stress of D4 are half an output voltage, that is, 0.5$V_{bus}$. A type of a diode component can be selected based on the voltage stress. This is an advantage of a three-level boost circuit with the flying capacitor.

However, when output ends of a plurality of multi-level boost circuits are connected in parallel, and a voltage on an input end of one or more multi-level boost circuits is less than a startup voltage of the boost power conversion circuit, a bus voltage is set on an output end of a boost circuit whose input end is connected to an input source. Because the output ends of all the boost circuits are connected in parallel, a diode in a boost circuit in which a voltage on an input end is less than the startup voltage of the boost power conversion circuit bears voltage stress whose magnitude is the bus voltage. Consequently, the diode is damaged, or otherwise, a type of a component whose voltage stress is greater than or equal to the bus voltage needs to be selected as the diode.

It should be noted that, one case in which the voltage on the input end of the boost power conversion circuit is less than the startup voltage of the boost power conversion circuit is that the input end of the boost power conversion circuit is not connected to the input source. For example, in the photovoltaic power generation field, the input end of the boost power conversion circuit is not connected to a corresponding photovoltaic component. When the input end of the boost power conversion circuit is not connected to the input source, the voltage on the input end of the boost power conversion circuit is less than the startup voltage, in other words, the boost power conversion circuit cannot be started to work.

Figure 12:
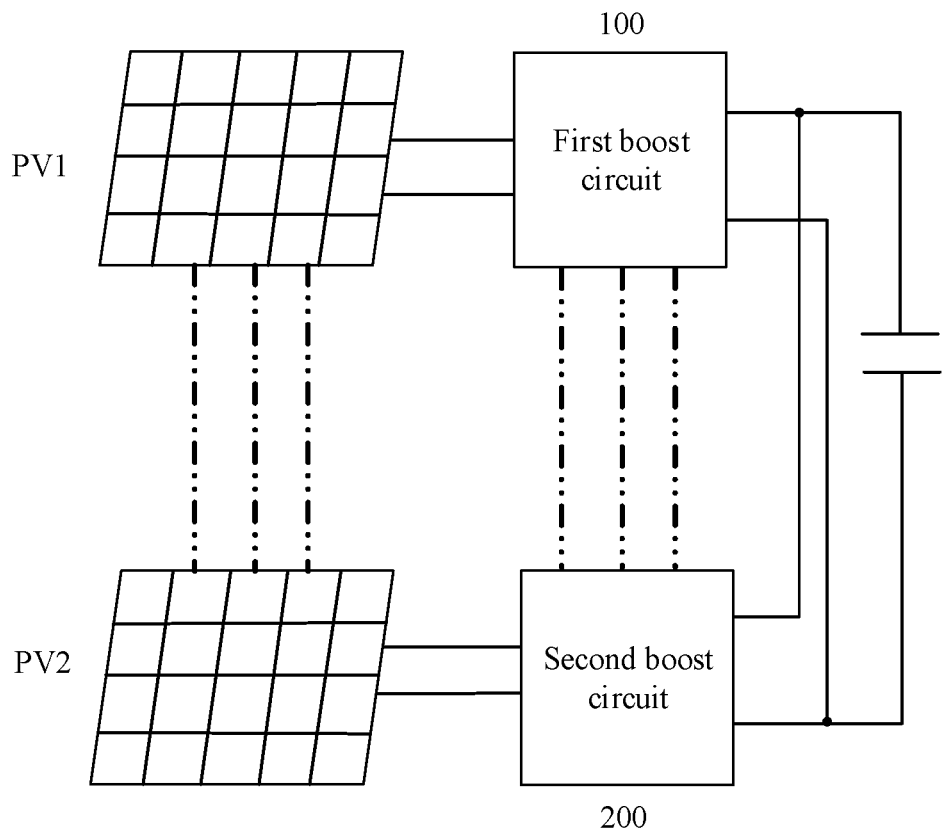
FIG. 12 is a schematic diagram of application when output ends of a plurality of boost circuits are connected in parallel in a photovoltaic power generation system according to an embodiment.

For example, FIG. 12 is a schematic diagram showing that output ends of a plurality of boost circuits are connected in parallel in the photovoltaic power generation field.

An output end of a first boost circuit 100 and an output end of a second boost circuit 200 are connected in parallel, an input end of the first boost circuit 100 is connected to a first photovoltaic component PV1, and an input end of the second boost circuit 200 is connected to a second photovoltaic component PV2. In actual application, one power station includes N PVs, and N is a positive integer. For N boost circuits, a user may configure a connection of each PV at random, and it is possible that one or more PVs are not connected to a corresponding boost circuit. In this case, a diode in a boost circuit that is not connected to a PV bears a relatively high bus voltage. Still refer to FIG. 1. When output ends of a plurality of boost circuits are connected in parallel, in other words, the plurality of boost circuits share an output bus, if another boost circuit has been powered on, but this boost circuit is not powered on, there is a bus voltage, and because both a voltage of a flying capacitor and an input voltage of this boost circuit are 0, it can be approximately considered as equipotential between a cathode of D3 and an anode of D2. In this case, D4 bears the entire bus voltage Vbus. If a type of D4 is selected based on stress of 0.5Vbus, D4 breaks down due to overvoltage.

Therefore, to resolve the foregoing technical problems, this application provides a boost power conversion circuit that includes a voltage control circuit. The boost power conversion circuit includes a first diode and a second diode that are connected in series, and both the first diode and the second diode are freewheeling diodes. When there is a bus voltage on an output end of the boost power conversion circuit, the first diode and the second diode bear a bus voltage in a reverse direction. Therefore, a voltage of a common point of the first diode and the second diode needs to be clamped. The voltage control circuit added in this embodiment of this application may clamp the voltage of the common point of the first diode and the second diode, and make, when a voltage on an input end of the boost power conversion circuit is less than a startup voltage of the boost power conversion circuit, the voltage borne by the common point of the first diode and the second diode less than the bus voltage, so that voltage stress borne by the common point of the first diode and the second diode can be reduced, and selection of a diode type is facilitated.

Circuit Embodiment 1

Figure 13:
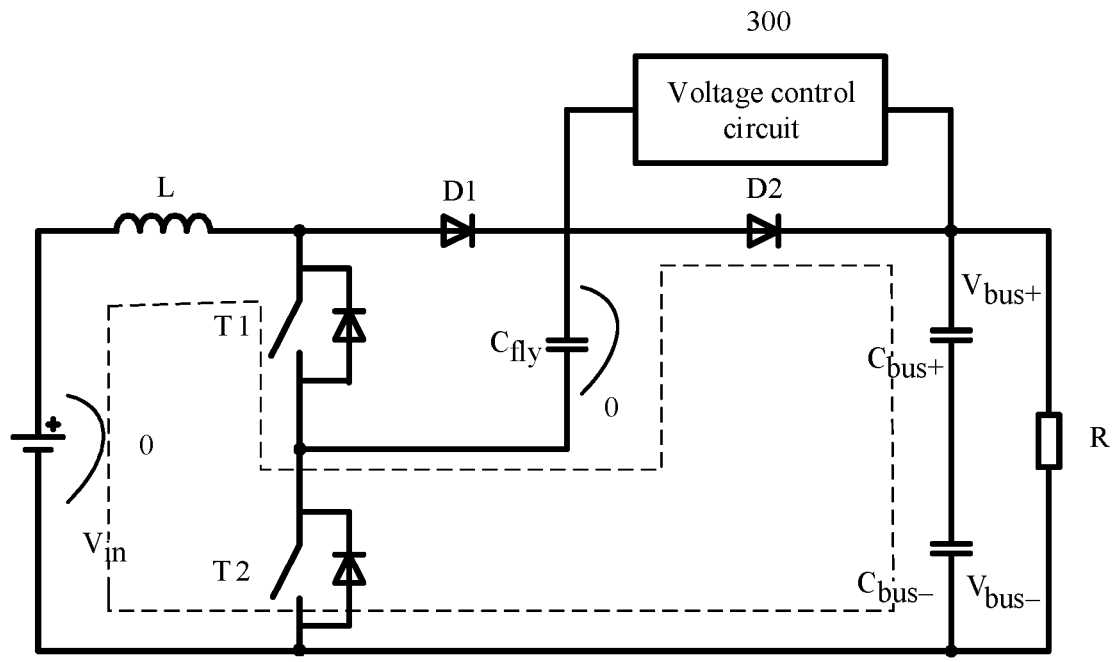
FIG. 13 is a schematic diagram of a boost power conversion circuit according to an embodiment of this application.

FIG. 13 is a schematic diagram of a boost power conversion circuit according to an embodiment of this application.

The boost power conversion circuit provided in this embodiment includes a first switching transistor T1, a second switching transistor T2, an inductor L, a flying capacitor Cfly, a first diode D1, a second diode D2, and a voltage control circuit 300.

The inductor L, the first diode D1, and the second diode D2 are successively connected in parallel to form a first branch, and the first branch is connected in series to an input positive electrode and an input negative electrode of the boost power conversion circuit to form a main circuit. The inductor L, the first switching transistor T1, and the second switching transistor T2 are connected in series to form a first closed loop, and the first switching transistor T1, the second switching transistor T2, the first diode D1, and the second diode D2 form a second closed loop. One end of the flying capacitor Cfly is connected to a common point of the first diode D1 and the second diode D2, and the other end of the flying capacitor Cfly is connected to a common point of the first switching transistor T1 and the second switching transistor T2.

There are the following two implementations for the voltage control circuit 300.

In one implementation, the voltage control circuit is connected in series in a third closed loop. The voltage control circuit is configured to make a voltage borne by the second diode less than a bus voltage of the boost power conversion circuit. The bus voltage is a voltage difference between a positive bus voltage and a negative bus voltage, in other words, a voltage difference between Vbus+ and Vbus−.

In the other implementation, a first end of the voltage control circuit 300 is connected to a common end of the first diode D1 and the second diode D2, and a second end of the voltage control circuit 300 is connected to a reference point. The reference point is used to provide a clamping potential, and the clamping potential is between a negative bus potential and a positive bus potential. The voltage control circuit is configured to: when a voltage on an input end of the boost power conversion circuit is less than a startup voltage of the boost power conversion circuit, clamp a voltage of the common point of the first diode and the second diode.

It should be noted that the clamping potential may have a same reference potential as the positive bus potential and the negative bus potential. For example, the clamping potential, the positive bus potential, and the negative bus potential all use the ground as a reference potential.

The third closed loop is a loop including the inductor L, the first switching transistor T1, the flying capacitor Cfly, the second diode D2, and an input source, and is a concave loop formed by dashed lines shown in FIG. 13.

When the voltage on the input end of the boost power conversion circuit is less than the startup voltage of the boost power conversion circuit, the voltage control circuit 300 is configured to clamp the voltage of the common point of D1 and D2, so that the voltage of the common point of D1 and D2 is less than the bus voltage of the boost power conversion circuit.

The voltage control circuit 300 is configured to: when the voltage on the input end of the boost power conversion circuit is less than the startup voltage of the boost power conversion circuit, clamp the voltage of the common point of D1 and D2. If the voltage of the common point of D1 and D2 is not clamped, because an output end of the boost power conversion circuit is connected in parallel to another boost power conversion circuit, and an input end of the another boost power conversion circuit is connected the input source, a bus voltage is set on the output end. In this case, the bus voltage is exerted on D2, and D2 bears the bus voltage. The voltage control circuit 300 in this embodiment forcibly clamps the voltage of the common point of D1 and D2 at a voltage value that is less than the bus voltage. In this way, D2 does not need to bear a relatively high bus voltage, so that voltage stress of D2 is reduced, and selection of a type of D2 is facilitated.

In addition, when the input end of the boost conversion circuit is connected to the input source, the voltage control circuit 300 may be disconnected, so that the voltage control circuit 300 loses effect, in other words, does not clamp a voltage of D2. Therefore, normal working of the boost conversion circuit is not affected.

In specific implementation, the voltage control circuit 300 may include a voltage division component, and divide the bus voltage and then clamp divided voltages on two ends of D2. Alternatively, the voltage control circuit 300 may be connected to a reference point, and a clamping potential of the reference point is between a negative bus potential and a positive bus potential. It may be understood that a smaller clamping voltage leads to smaller voltage stress borne by D2 and makes it easier to select a type of D2.

Specific implementations of the voltage control circuit 300 are separately described below with reference to the accompanying drawings. First, a second end of the voltage control circuit 300 may be connected to a reference point, and a clamping potential of the reference point is between a negative bus potential and a positive bus potential. A specific value of the clamping potential is not specifically limited in this embodiment of this application. For example, a voltage of the clamping potential may be half the bus voltage or ¼ of the bus voltage.

Circuit Embodiment 2

Figure 14:
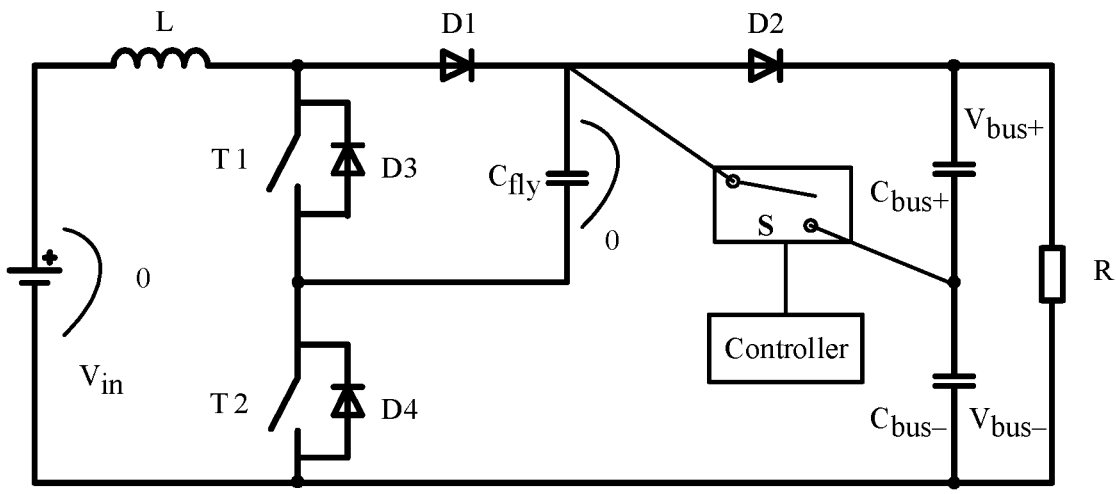
FIG. 14 is a schematic diagram of another boost power conversion circuit according to an embodiment of this application.

FIG. 14 is a schematic diagram of another boost power conversion circuit according to an embodiment of this application.

An example in which a voltage control circuit includes at least a controllable switch is used as an example for description in this embodiment. The controllable switch may be a relay, a contactor, a semiconductor switch, or a reverse-conducting switching transistor. The semiconductor switch includes a metal oxide field-effect transistor or an insulated gate bipolar transistor, and the reverse-conducting switching transistor includes a metal oxide field-effect transistor or a reverse-conducting insulated gate bipolar transistor. When the controllable switch is a relay or a contactor, a normally-closed type may be used, to be specific, when there is no input source, the controllable switch is in an on state, and the controllable switch is in an off state when being powered on.

A controller is required to control on/off states of the semiconductor switch and the reverse-conducting switching transistor. An example in which the controllable switch is a third switching transistor S and a controller is required to control a status of the third switching transistor is used below for description.

In this embodiment, for example, the voltage of the clamping potential is half the bus voltage Vbus, that is, ½Vbus. Generally, a first bus capacitor Cbus+ and a second bus capacitor Cbus− that are connected in series are connected between an output positive electrode and an output negative electrode of the boost power conversion circuit, and a capacitance of Cbus+ is equal to a capacitance of Cbus−, in other words, a middle point voltage of Cbus+ and Cbus− is half the bus voltage Vbus. In other words, a first end of S is connected a common point of D1 and D2, and a second end of S is connected to a common point of Cbus+ and Cbus−.

Because the controllable switching transistor cannot automatically perform switching actions, the boost power conversion circuit in this embodiment further includes a controller (not as shown in FIG. 14); and the controller is configured to: when a voltage on an input end of the boost power conversion circuit is less than a startup voltage of the boost power conversion circuit, control to close the controllable switching transistor S to clamp the power control circuit, in other words, clamp a voltage of D2 at ½Vbus. In this way, D2 does not need to bear the entire bus voltage Vbus.

A working principle after S is added is described below.

Before the input end of the boost power conversion circuit is powered on ($V_{in}=0$), a voltage is set on a bus. For example, output sides of a plurality of boost power conversion circuits are connected in parallel and share a same bus, other boosts have been powered on, but this boost power conversion circuit has no input voltage $V_{in}$. If S is not added, both $V_{Cfly}$ and $V_{in}$ are 0, T1 is equivalent to being bidirectionally short-circuited by D3 and D1, and therefore, $V_{in}$, L, T1, T2, D3, and Cfly may all be approximately considered as equipotential. In this case, D2 bears the entire bus voltage $V_{bus}$. If a type of D2 is selected based on $0.5V_{bus}$, D2 breaks down due to overvoltage. After S is added, when another boost is powered on, the bus is charged, and at the same time, because S is conducted, a current passes through S, Cfly, D3, and an input capacitor to form a charging loop, thereby ensuring that a voltage on a positive end of Cfly is not less than a negative bus voltage.

The controller is further configured to: when it is determined that the input end of the boost power conversion circuit is connected to the input source, control to open S to disconnect the voltage control circuit. In other words, when S is opened, the entire voltage control circuit does not work, and the entire boost power conversion circuit works normally.

Figure 15:
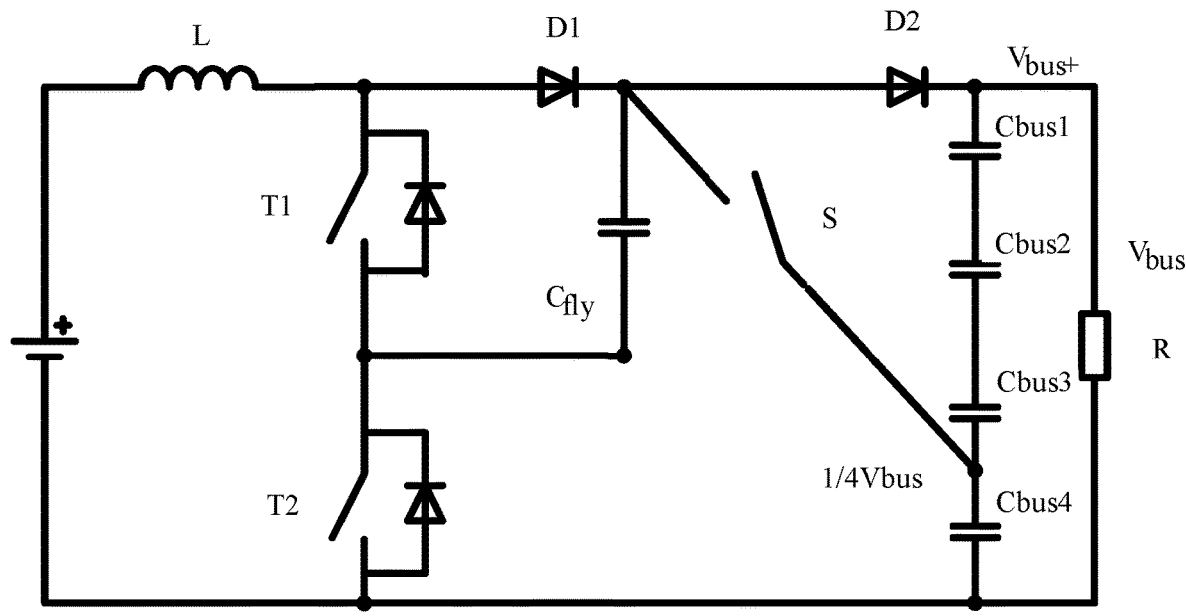
FIG. 15 is a schematic diagram of still another boost power conversion circuit according to an embodiment of this application.

In FIG. 14, a voltage clamping point connected to a second end of S is ½Vbus, and the second end may further be connected to another voltage point in addition to ½Vbus, for example, ¼Vbus. Specifically, refer to FIG. 15. Four bus capacitors that are connected in series are connected between an output positive electrode and an output negative electrode of the boost power conversion circuit: a first bus capacitor Cbus1, a second bus capacitor Cbus2, a third bus capacitor Cbus3, and a fourth bus capacitor Cbus4. The first switching transistor T1, the second switching transistor T2, the first diode D1, the second diode D2, the first bus capacitor Cbus1, the second bus capacitor Cbus2, the third bus capacitor Cbus3, and the fourth bus capacitor Cbus4 form a second closed loop. The reference point is any common point between the first bus capacitor Cbus1, the second bus capacitor Cbus2, the third bus capacitor Cbus3, and the fourth bus capacitor Cbus4. In FIG. 15, for example, the reference point is a common point of Cbus3 and Cbus4. When capacitances of the four bus capacitors are equal, a voltage provided by the reference point is ¼Vbus. In addition, the reference point may be another reference point in addition to the reference point shown in FIG. 15. For example, the reference point is a common point of Cbus1 and Cbus2, and a corresponding clamping voltage is ¾Vbus. Certainly, the reference point may also be a common point of Cbus2 and Cbus3, and a corresponding clamping voltage is ½Vbus.

In both FIG. 14 and FIG. 15, locations of the reference point are described as examples, and a voltage corresponding to the reference point may alternatively be another value provided that the voltage is less than the bus voltage. This is not specifically limited in this embodiment of this application.

In addition, both FIG. 14 and FIG. 15 are described by using an example in which the inductor L is connected to an end that is close to the input positive electrode. To be specific, the inductor L, the first diode D1, and the second diode D2 are successively connected in series to form a first branch, and the first branch is connected in series to the input end of the boost power conversion circuit to form a main circuit. Specifically, a first end of the inductor L is connected to the input positive electrode, and a second end of the inductor L is connected to the first diode D1 and the second diode D2 that are successively connected in series.

Figure 16:
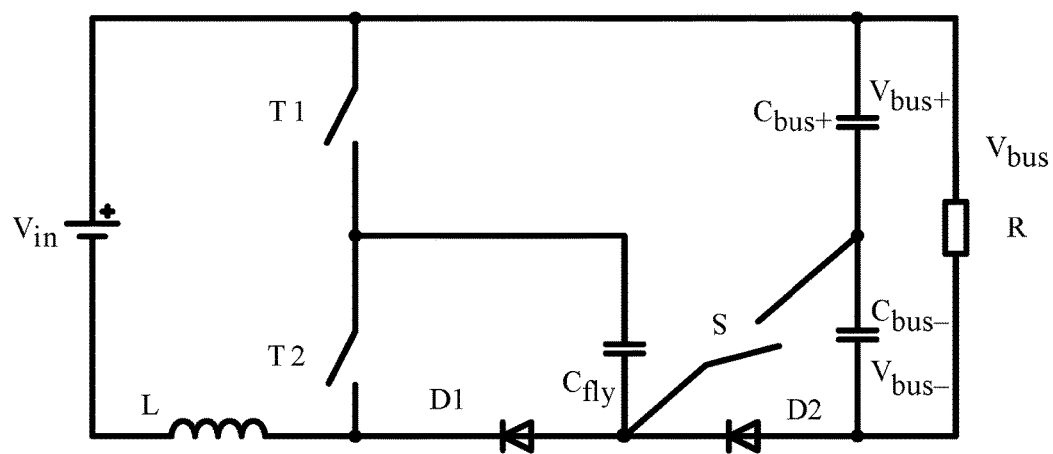
FIG. 16 is a schematic diagram showing that an inductor in a boost power conversion circuit is connected to an input negative electrode according to an embodiment of this application.

It may be understood that L may be alternatively connected to an end that is close to the input negative electrode. Specifically, refer to FIG. 16. FIG. 16 is a schematic diagram that corresponds to FIG. 14 and that shows that L is connected to an end of the input negative electrode.

The inductor L, the first diode D1, and the second diode D2 are successively connected in series to form a first branch, and the first branch is connected in series to the input end of the boost power conversion circuit to form a main circuit. Specifically, a first end of the inductor L is connected to the input negative electrode, and a second end of the inductor L is connected to the first diode D1 and the second diode D2 that are successively connected in series.

In the following embodiments, a connection manner of the inductor may also be the foregoing two manners. In other words, the inductor is connected to the input positive electrode of the boost power conversion circuit or the input negative electrode of the boost power conversion circuit.

FIG. 14 to FIG. 16 are described by using an example in which a switch included in the voltage control circuit is a controllable switching transistor. Descriptions are provided below by using an example in which the switch is an uncontrollable diode. Due to a unilateral conduction feature of a diode, a controller is not required to control an on/off state of the diode, and the diode is automatically conducted or cut off when a voltage between two ends of the diode meets a condition.

Circuit Embodiment 3

Figure 17A:
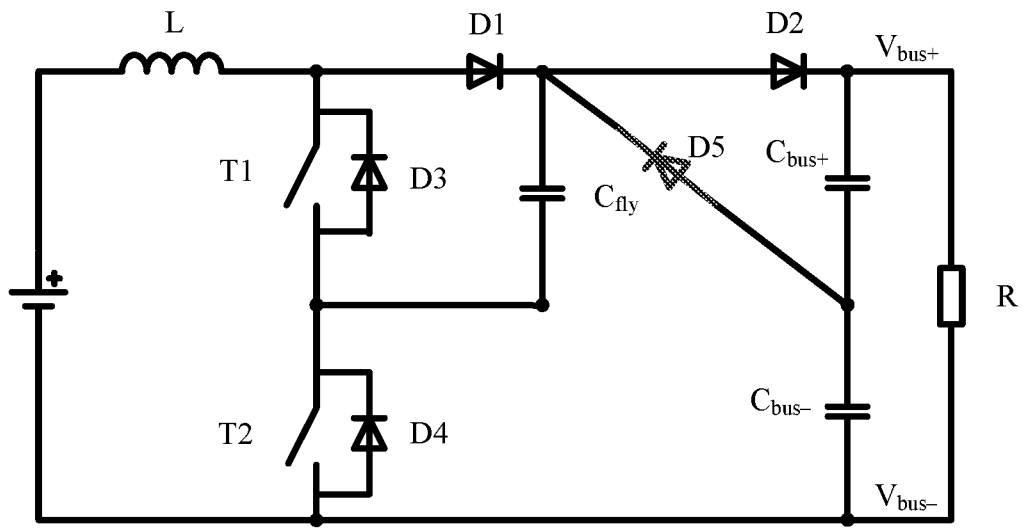
FIG. 17*a* is a schematic diagram of yet another boost power conversion circuit according to an embodiment of this application.

FIG. 17a is a schematic diagram of still another boost power conversion circuit according to an embodiment of this application.

A voltage control circuit in the boost power conversion circuit provided in this embodiment includes at least a third diode D5.

An anode of the third diode D5 is connected to a reference point, and a cathode of the third diode D5 is connected to a common point of the first diode D1 and the second diode D2.

A working principle after S is added is described below.

Before an input end of the boost power conversion circuit is powered on ($V_{in}=0$), a voltage is set on a bus. For example, output sides of a plurality of boost power conversion circuits are connected in parallel and share a same bus, other boosts have been powered on, but this boost power conversion circuit has no input voltage $V_{in}$. If D5 is not added, both a voltage $V_{Cfly}$ of a flying capacitor and the input voltage $V_{in}$ are 0, and T is equivalent to being bidirectionally short-circuited by diodes D3 and D1. Therefore, $V_{in}$, an inductor L, switching modules T1 and T2, D1, and the flying capacitor may all be approximately considered as equipotential. In this case, D2 bears an entire bus voltage $V_{bus}$. If a type of D2 is selected based on $0.5V_{bus}$, D2 breaks down due to overvoltage. After D5 is added, when another boost is powered on, the bus is charged, and at the same time, because D5 is conducted, a current passes through D5, the flying capacitor, D3, and an input capacitor to form a charging loop, thereby ensuring that a voltage on a positive end of the flying capacitor is not less than a negative bus voltage.

It should be noted that, in the embodiments corresponding to FIG. 14 to FIG. 17a, the voltage control circuit may further include a resistor. For example, for FIG. 14, the resistor and the third switching transistor S are connected in series, and for FIG. 17a, the third diode D5 may be connected in series to the resistor. A quantity of resistors is not specifically limited in the embodiments of this application. One resistor may be connected in series in the voltage control circuit, or a plurality of resistors may be connected in series in the voltage control circuit.

That the second end of the voltage control circuit is connected to the reference point is described in the foregoing embodiments. The following embodiments show that the voltage control circuit is connected in series in a loop and is configured to divide a bus voltage, to clamp a voltage of a common point of D1 and D2.

Circuit Embodiment 4

Figure 17B:
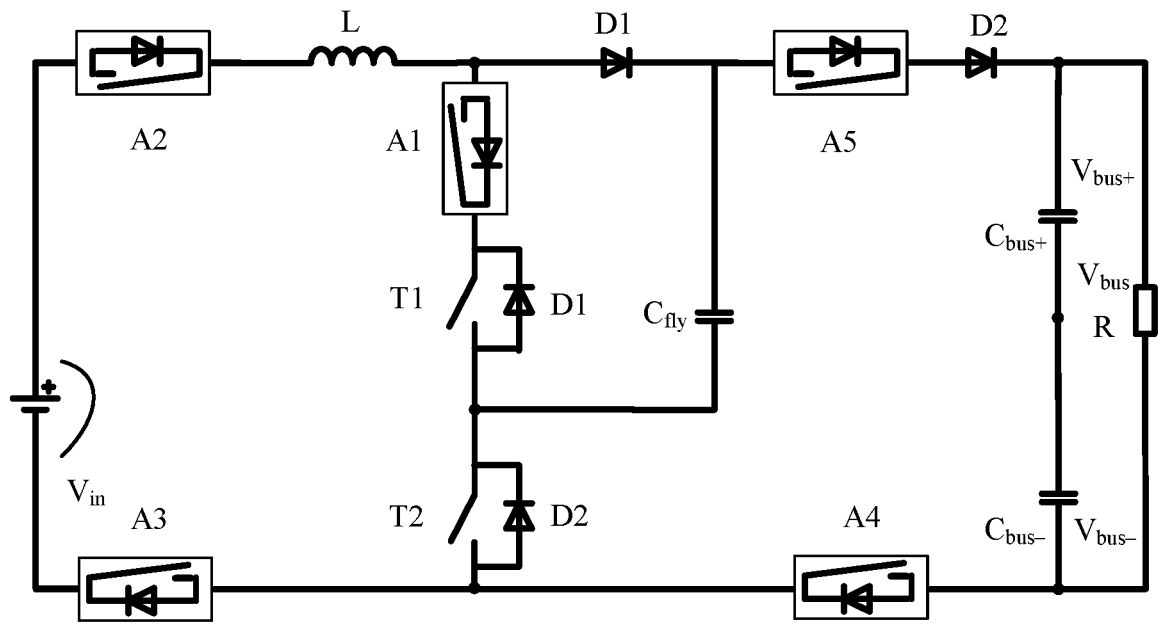
FIG. 17*b* is a schematic diagram of a boost power conversion circuit according to an embodiment of this application.

FIG. 17b is a schematic diagram of a boost power conversion circuit according to an embodiment of this application.

This embodiment shows that a voltage control circuit can be connected in series in any one or more of a plurality of locations in a loop. For simplicity, and to reduce components and costs, the voltage control circuit may be connected in series in the loop. A specific location in which the voltage control circuit is connected in series is not specifically limited. For example, the location may be locations shown by A1, A2, A3, A4, and A5 in FIG. 17b.

It should be noted that the voltage control circuit connected in series in the loop includes any one of a clamping diode, a controllable switching transistor, and a compound component, and the compound component includes a clamping diode and a controllable switching transistor that are connected in parallel.

When the compound component further includes controllable switching transistors that are connected in parallel on two ends of the clamping diode or includes the clamping diode and the controllable switching transistor that are connected in parallel, the voltage control circuit further includes a controller.

The controller is configured to: when a voltage on an input end of the boost power conversion circuit is less than a startup voltage of the boost power conversion circuit, control to open the controllable switching transistor, or otherwise, control to close the controllable switching transistor.

In FIG. 17b, A1 to A5 are forms in which a diode and a controllable switching transistor are connected in parallel. In actual application, many controllable switching transistors have an antiparallel diode, and such a controllable switching transistor can be directly used as the voltage control circuit. It may be understood that a direction in which a current passes through the diode is a direction in which a current in a loop.

Descriptions are provided below by using an example in which the voltage control circuit is connected between D1 and D2.

Figure 18:
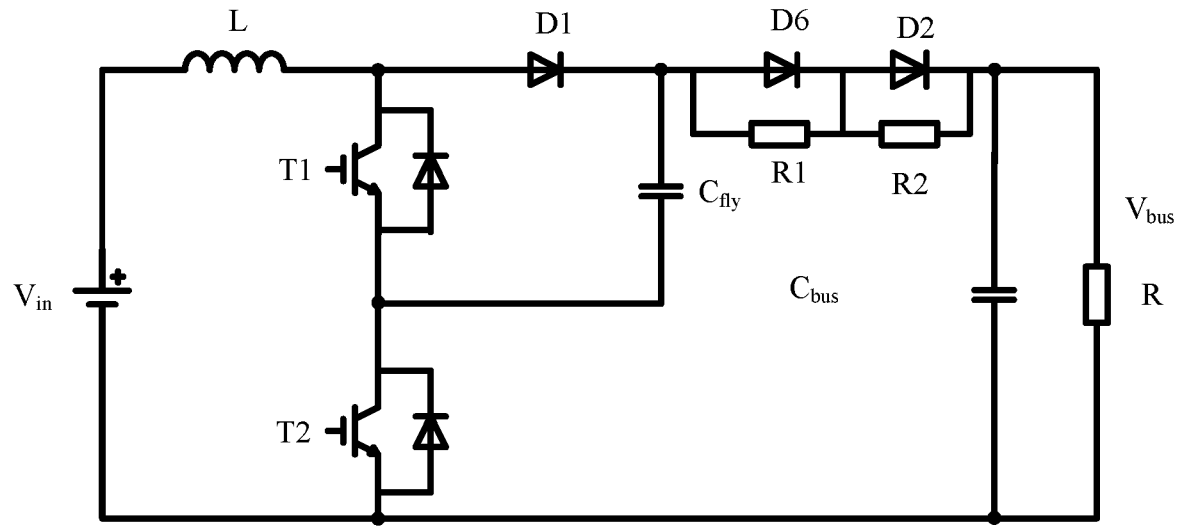
FIG. 18 is a schematic diagram of another boost power conversion circuit according to an embodiment of this application.

FIG. 18 is a schematic diagram of still another boost power conversion circuit according to an embodiment of this application.

A voltage control circuit in the boost power conversion circuit provided in this embodiment includes a clamping diode D6, a first resistor R1, and a second resistor R2.

An anode of the clamping diode D6 is connected to a cathode of the first diode D1, and a cathode of the clamping diode D6 is connected to an anode of the second diode D2.

The first resistor R1 is connected in parallel between two ends of the clamping diode D6.

The second resistor R2 is connected in parallel between two ends of the second diode D2.

A working principle of this embodiment is described below.

When a voltage on an input end of the boost power conversion circuit is less than a startup voltage of the boost power conversion circuit, a bus voltage Vbus is exerted on a series loop including R1 and R2, and R1 and R2 divide the voltage. Therefore, a voltage borne by D4 corresponds to a divided voltage of R2, and a voltage on R2 is less than the bus voltage, so that the voltage borne by D4 can be reduced. Certainly, a smaller value of R2 and a larger value of R1 lead to a smaller voltage borne by D4. However, because D6 is also a diode, a voltage on R1 is a voltage borne by D6. Therefore, for unified selection of diode types, a resistance of R1 may be equal to a resistance of R2, in other words, R1 and R2 equally divide the bus voltage. However, the resistance of R1 and the resistance of R2 may alternatively be unequal.

It should be noted that, in the solution provided in this embodiment, when the voltage control circuit is A4 or A5, the voltage control circuit is not only applicable to a case in which the voltage on the input end of the boost power conversion circuit is less than the startup voltage of the boost power conversion circuit, but is also applicable to a case in which the input end is reversely connected to an input source, to be specific, a case in which a positive electrode and a negative electrode are reversed. However, implementations of A1 to A3 are only applicable to a case in which the voltage on the input end is less than the startup voltage of the boost power conversion circuit.

Circuit Embodiment 5

The embodiment corresponding to FIG. 18 includes the clamping diode D6. Because D6 is connected in series in a main circuit, to be specific, when the input end of the boost power conversion circuit is connected to an input source, a current passes through D6 when D6 is conducted, and a current loss of the diode is relatively large. Therefore, power energy is wasted, efficiency is reduced, and photovoltaic power generation efficiency is reduced especially in the photovoltaic power generation field. To reduce a loss of D6, a switch may be further connected in parallel between two ends of D6. When the input end of the boost power conversion circuit is connected to the input source, the switch that is connected in parallel to D6 is controlled to be closed, to short-circuit D6, so that a current does not pass through D6. Therefore, a power energy loss caused by conduction of D6 can be avoided. Detailed descriptions are provided below with reference to the accompanying drawings.

Figure 19:
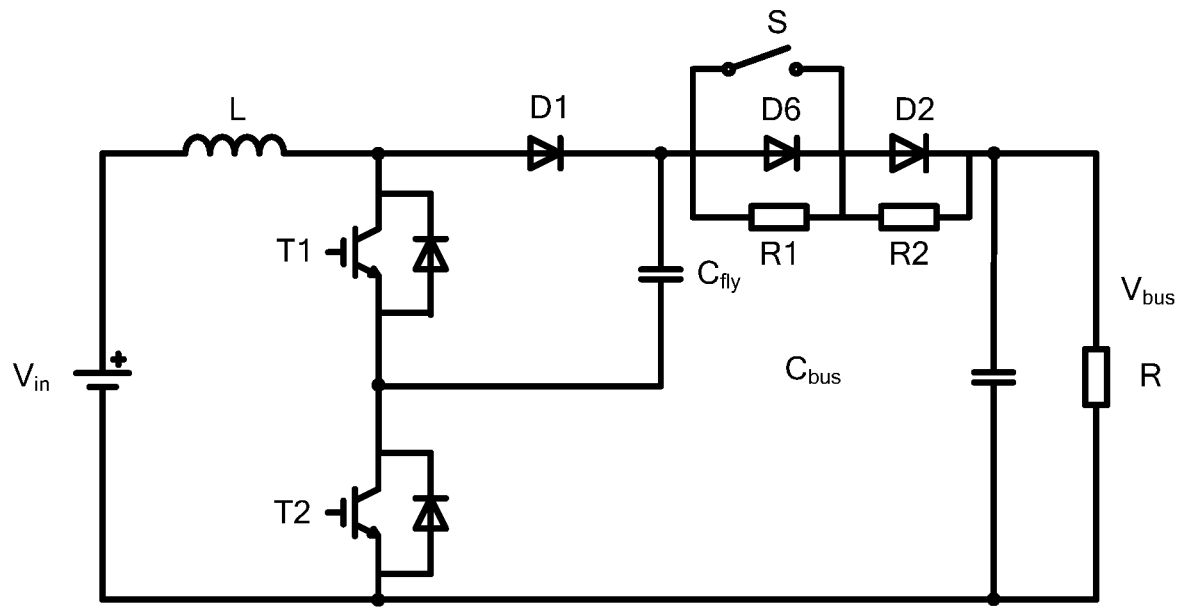
FIG. 19 is a schematic diagram of still another boost power conversion circuit according to an embodiment of this application.

FIG. 19 is a schematic diagram of still another boost power conversion circuit according to an embodiment of this application.

A voltage control circuit provided in this embodiment further includes a controller (not shown in the figure) and a fifth switching transistor S. The fifth switching transistor S is connected in parallel between two ends of the clamping diode D6.

The controller is configured to: when it is determined that the voltage on the input end of the boost power conversion circuit is less than the startup voltage of the boost power conversion circuit, control to open the fifth switching transistor S, and is further configured to: when it is determined that the input end of the boost power conversion circuit is connected to the input source, control to close S.

In this embodiment, when the input end of the boost power conversion circuit is connected to the input source, S is controlled to be closed, so that D6 and D2 are connected in series, and R1 and R2 divide the bus voltage. D6 bears a voltage divided by R1, and D2 bears a voltage divided by R2. Therefore, voltage stress borne by D2 can be reduced, and D2 is prevented from bearing the bus voltage alone. When the input end of the boost power conversion circuit is connected to the input source, a voltage of D2 does not need to be clamped. Therefore, S may be controlled to be closed, to short-circuit D6. Therefore, a current does not pass through D6, and a power energy loss caused when a current passes through D6 can be avoided.

Circuit Embodiment 6

In both the embodiment corresponding to FIG. 18 and the embodiment corresponding to FIG. 19, a fourth diode is included. In the following descriptions, no fourth diode is included, and a voltage of the second diode is clamped by using a controllable switch and a voltage division resistor.

Figure 20:
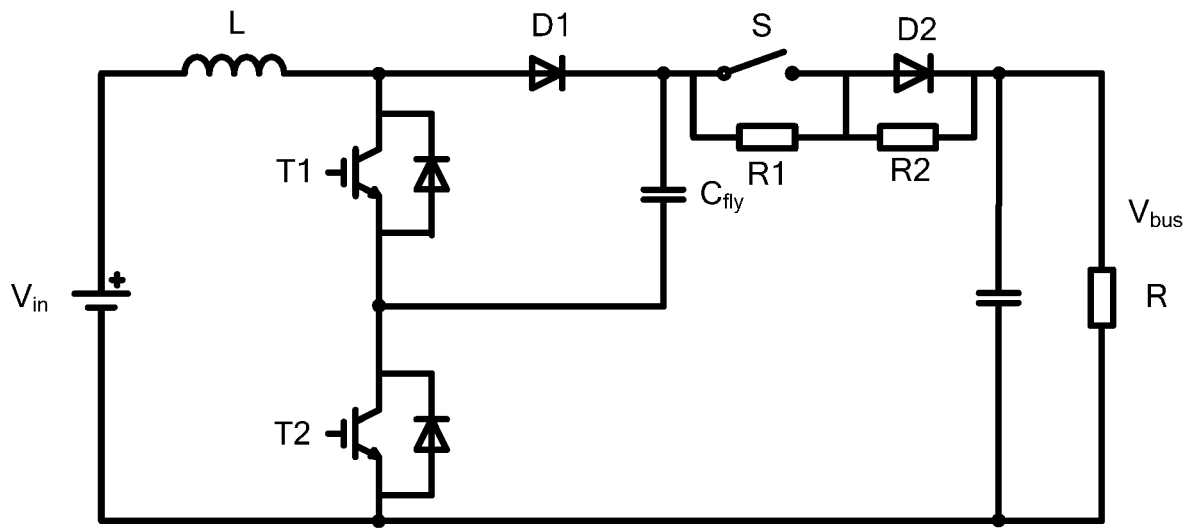
FIG. 20 is a schematic diagram of yet another boost power conversion circuit according to an embodiment of this application.

FIG. 20 is a schematic diagram of another boost power conversion circuit according to an embodiment of this application.

A voltage control circuit provided in this embodiment further includes a controller (not shown in the figure), a fifth switching transistor S, a first resistor R1, and a second resistor R2.

S is connected in series between the first diode D1 and the second diode D2.

The first resistor R1 is connected in parallel between two ends of the fifth switching transistor S.

The second resistor R2 is connected in parallel between two ends of the second diode D2.

The controller is configured to: when it is determined that a voltage on an input end of the boost power conversion circuit is less than a startup voltage of the boost power conversion circuit, control to open S, and is further configured to: when it is determined that the input end of the boost power conversion circuit is connected to an input source, control to close S.

When the voltage on the input end of the boost power conversion circuit is less than the startup voltage of the boost power conversion circuit, voltage stress of D2 needs to be reduced. Therefore, in this case, R1 and R2 need to be opened, so that R1 and R2 divide the voltage. Voltage stress borne by D2 is a voltage divided by R1, and the voltage divided by R2 is less than the bus voltage. Therefore, D2 is prevented from bearing voltage stress whose magnitude is the bus voltage. When the input end of the boost power conversion circuit is connected to the input source, to reduce a circuit loss, S may be controlled to be closed, so that S short-circuits R1, and a power energy loss caused by R1 can be avoided.

It should be noted that the embodiments corresponding to FIG. 18 to FIG. 20 are described by using an example in which the inductor L is connected to the input positive electrode. It may be understood that, the embodiments corresponding to FIG. 18 to FIG. 20 are also applicable to a case in which the inductor L is connected to the input negative electrode. In addition, selection of a type of the controllable switch in FIG. 19 and FIG. 20 is not limited in the embodiments of this application. Refer to a type selection principle of the controllable switch in the foregoing other embodiments.

Method Embodiment

Based on the boost power conversion circuit provided in the foregoing embodiments, an embodiment of this application further provides a boost power conversion circuit control method. The boost power conversion circuit control method is described in detail below with reference to the accompanying drawings.

Figure 21:
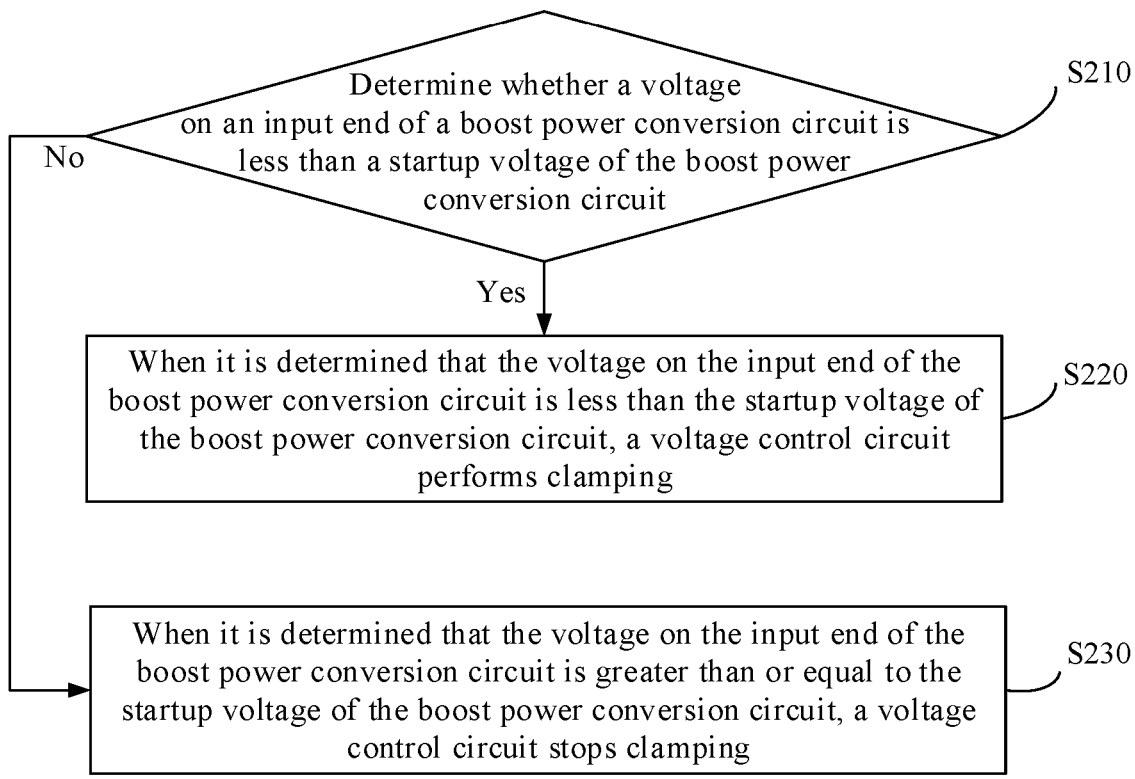
FIG. 21 is a flowchart of a boost power conversion circuit control method according to an embodiment of this application.

FIG. 21 is a flowchart of a boost power conversion circuit control method according to an embodiment of this application.

The boost power conversion circuit control method provided in this embodiment is applied to the boost power conversion circuit provided in any one of the foregoing embodiments. The method includes the following operations.

Operation S210: Determine whether a voltage on an input end of the boost power conversion circuit is less than a startup voltage of the boost power conversion circuit, and if yes, perform operation S220, or otherwise, perform operation S230.

In one embodiment, whether the input end is connected to an input source may be determined by measuring the voltage on the input end of the boost power conversion circuit. When the voltage on the input end is less than a preset voltage value, it indicates that the voltage on the input end is less than the startup voltage of the boost power conversion circuit. Certainly, if a voltage control circuit is automatically triggered, the voltage on the input end may not need to be measured. When there is no input source, the voltage control circuit is automatically connected to clamp a voltage. For example, when there is no input source, a state of a normally-closed relay or contactor is on; and when there is the input source, a state is off. How to determine whether the input end is connected to the input source is not specifically limited in this embodiment of this application.

Operation S220: When it is determined that the voltage on the input end of the boost power conversion circuit is less than the startup voltage of the boost power conversion circuit, the voltage control circuit makes a voltage borne by the second diode less than a bus voltage of the boost power conversion circuit.

Operation S230: When it is determined that the voltage on the input end of the boost power conversion circuit is greater than or equal to the startup voltage, the voltage control circuit stops clamping.

The method provided in this embodiment is applicable to the boost power conversion circuit. The boost power conversion circuit includes a first diode and a second diode that are connected in series, and both the first diode and the second diode are freewheeling diodes. When the voltage on the input end of the boost power conversion circuit is less than the startup voltage of the boost power conversion circuit, but there is a bus voltage on an output end, the first diode and the second diode bear the bus voltage in a reverse direction. Therefore, a voltage of a common point of the first diode and the second diode needs to be clamped. The voltage control circuit added in this embodiment of this application may clamp the voltage of the common point of the first diode and the second diode, and make, when no input source is connected to the input end of the boost power conversion circuit, the voltage borne by the common point of the first diode and the second diode less than a bus voltage, so that voltage stress borne by the common point of the first diode and the second diode can be reduced, and selection of a diode type is facilitated.

Based on the boost power conversion circuit and method provided in the foregoing embodiments, the boost power conversion circuit may be applied to many situations, for example, the photovoltaic power generation field. Descriptions are provided below by using an example in which the boost power conversion circuit is applied to the photovoltaic power generation field.

Figure 22:
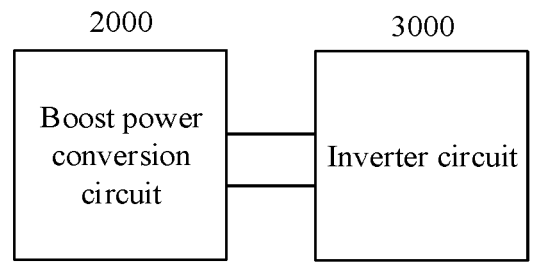
FIG. 22 is a schematic diagram of an inverter according to an embodiment of this application.

An embodiment of this application further provides an inverter. FIG. 22 is a schematic diagram of an inverter according to an embodiment of this application.

The inverter includes two levels of circuits. One level is the foregoing boost power conversion circuit 2000, that is, DC-DC. The other level is an inverter circuit 3000, that is, DC-AC. The inverter is applied to the photovoltaic power generation field. To be specific, an input end of the boost power conversion circuit 2000 is connected to a photovoltaic component PV, and is configured to boost and then output an output voltage of the photovoltaic component PV to an input end of the inverter circuit 3000. The inverter circuit 3000 inverts a direct current output by the boost power conversion circuit 2000 into an alternating current and provides the alternating current to a subsequent-level circuit. The subsequent-level circuit may be an alternating-current power network or alternating-current load.

Because a power station in the photovoltaic power generation field usually includes a plurality of inverters, output ends of DC-DC in the plurality of inverters are connected in parallel, but due to some reasons, an input end of specific DC-DC is not successfully connected to the photovoltaic component, and other DC-DCs that are connected in parallel are successfully connected to the photovoltaic component. Because the output ends are connected in parallel, a bus voltage has already been set on output ends of the DC-DCs that are connected in parallel, a diode in DC-DC whose input end is not successfully connected to the photovoltaic component bears a back voltage of the bus voltage. However, if the DC-DC provided in this embodiment of this application is used, the diode that bears the back voltage is protected, thereby making it easier to select a diode type.

Based on the boost power conversion circuit and method provided in the foregoing embodiments, the boost power conversion circuit may be applied to many situations, for example, the uninterruptible input source field and the photovoltaic power generation field. Descriptions are provided below by using an example in which the boost power conversion circuit is applied to the photovoltaic power generation field.

Embodiment of a photovoltaic power generation apparatus

A photovoltaic power generation apparatus provided in this embodiment includes a photovoltaic component and the boost power conversion circuit described in any one of the foregoing embodiments. The boost power conversion circuit and the photovoltaic component are in one-to-one correspondence. An input end of the boost power conversion circuit is connected to the photovoltaic component. The boost power conversion circuit is configured to boost and then output an output voltage of the connected photovoltaic component to a subsequent-level circuit.

Embodiment of a photovoltaic power generation system

Based on the boost power conversion circuit and method and the photovoltaic power generation apparatus provided in the foregoing embodiments, the boost power conversion circuit may be applied to many situations, for example, the uninterruptible input source field and the photovoltaic power generation field. Descriptions are provided below by using an example in which the boost power conversion circuit is applied to the photovoltaic power generation field.

An embodiment of this application further provides a photovoltaic power generation system. The photovoltaic power generation system is described in detail below with reference to the accompanying drawings.

Figure 23:
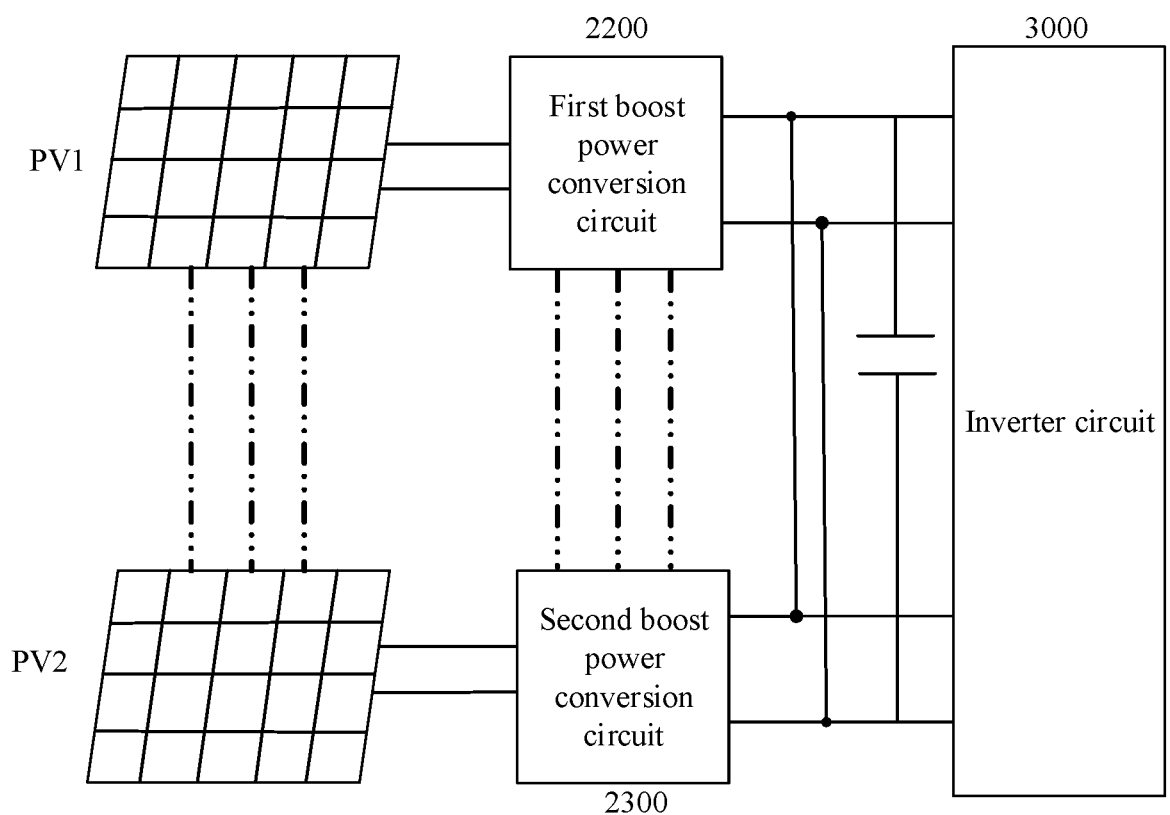
FIG. 23 is a schematic diagram of a photovoltaic power generation system according to an embodiment of this application.

Specifically, still refer to FIG. 23. The photovoltaic power generation system provided in this embodiment includes a photovoltaic component and at least two photovoltaic power generation apparatuses.

Output ends of boost power conversion circuits in all the photovoltaic power generation apparatuses are connected in parallel. Two photovoltaic power generation apparatuses are used as an example below for description. Correspondingly, two boost power conversion circuits are included. As shown in FIG. 23, an output end of a first boost power conversion circuit 2200 and an output end of a second boost power conversion circuit 2300 are connected in parallel. Both the output end of the boost power conversion circuit 2200 and the output end of the boost power conversion circuit 2300 are connected to an input end of an inverter circuit 3000.

An input end of each of the boost power conversion circuits is connected to a corresponding photovoltaic component.

The boost power conversion circuit is configured to boost and then output an output voltage of the connected photovoltaic component to a subsequent-level circuit. An input end of the first boost power conversion circuit 2200 is connected to a first photovoltaic component PV1, an input end of the second boost power conversion circuit 2300 is connected to a second photovoltaic component PV2, the first boost power conversion circuit 2200 is configured to boost an output voltage of PV1, and the second boost power conversion circuit 2300 is configured to boost a voltage of PV2.

However, in actual application, connections between some photovoltaic components and corresponding boost power conversion circuits may be disconnected. In other words, a voltage on an input end of the boost power conversion circuit is less than a startup voltage of the boost power conversion circuit. In this case, to reduce voltage stress of a second diode in the boost power conversion circuit, a voltage of the second diode needs to be clamped, so that the voltage stress borne by the second diode is reduced, and selection of a component type is facilitated.

It may be understood that, after output ends of all boost power conversion circuits are connected in parallel, the boost power conversion circuits may be connected to an inverter, and the inverter inverts a direct current into an alternating current and then feeds back the alternating current to an alternating-current power network or alternating-current load. In addition, after the output ends of all the boost power conversion circuits are connected in parallel, the boost power conversion circuits may be connected to a direct-current power network or direct-current load.

It should be understood that, in this application, "at least one" means one or more, and "a plurality of" means two or more. The term "and/or" describes an association between associated objects and represents that three associations may exist. For example, A and/or B may indicate that only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, or c may represent a, b, c, a-b, a-c, b-c, or a-b-c, where a, b, and c may be singular or plural.

The foregoing is merely preferable embodiments of the present invention, and does not constitute any limitation on the present invention. Although the present invention is disclosed above by using example embodiments, the example embodiments are not used to limit the present invention. Any person skilled in the art may make many possible variations and modifications to the technical solutions of the present invention or change the technical solutions of the present invention into equivalent embodiments by using the foregoing method and technical content within the range of the technical solutions of the present invention. Therefore, all content within the technical solutions of the present invention and any simple modification and equivalent change and modification made to the foregoing embodiments based on the technical essence of the present invention fall within the protection scope of the technical solutions of the present invention.

What is claimed is:

1. A boost power conversion circuit, comprising: a first switching transistor, a second switching transistor, an inductor, a flying capacitor, a first diode, a second diode, and a voltage control circuit; wherein the inductor, the first diode, and the second diode are successively connected in series to form a first branch, the first branch is connected in series to an input positive electrode and an input negative electrode of the boost power conversion circuit to form a main circuit, wherein an anode of the first diode is coupled to the input positive electrode of the boost power conversion circuit, a cathode of the first diode is coupled to an anode of the second diode, and a cathode of the second diode is coupled to the input negative electrode of the boost power conversion circuit; wherein the inductor, the first switching transistor, and the second switching transistor are connected in series to form a first closed loop, and the first switching transistor, the second switching transistor, the first diode, and the second diode form a second closed loop; and one end of the flying capacitor is connected to a common point of the first diode and the second diode, and an other end of the flying capacitor is connected to a common point of the first switching transistor and the second switching transistor;

the voltage control circuit is connected in a third closed loop, the third closed loop is a loop comprising the inductor, the first switching transistor, the flying capacitor, the second diode, the input positive electrode, the input negative electrode, and the voltage control circuit coupled in series, wherein the voltage control circuit is configured to make a voltage borne by the second diode less than a bus voltage of the boost power conversion circuit, and the bus voltage is a voltage difference between a positive bus voltage and a negative bus voltage; and the voltage control circuit is configured to clamp a voltage of the common point of the first diode and the second diode when a voltage on an input end of the boost power conversion circuit is less than a startup voltage of the boost power conversion circuit.

2. The boost power conversion circuit according to claim 1, wherein the voltage control circuit comprises one of a clamping diode, a controllable switching transistor, and a compound component; and the compound component comprises the clamping diode and the controllable switching transistor that are connected in parallel.

3. The boost power conversion circuit according to claim 2, wherein when the voltage control circuit comprises the controllable switching transistor or comprises the compound component, the voltage control circuit further comprises a controller; and the controller is configured to: when the voltage on the input end of the boost power conversion circuit is less than the startup voltage of the boost power conversion circuit, control to open the controllable switching transistor; and the controller is further configured to: when the voltage on the input end of the boost power conversion circuit is greater than the startup voltage of the boost power conversion circuit, control to close the controllable switching transistor.

4. The boost power conversion circuit according to claim 2, wherein when the voltage control circuit comprises the clamping diode, the voltage control circuit further comprises a first resistor and a second resistor;

the first resistor is connected in parallel between two ends of the clamping diode; and the second resistor is connected in parallel between two ends of the second diode.

5. The boost power conversion circuit according to claim 2, wherein when the voltage control circuit comprises the compound component, the voltage control circuit further comprises a first resistor and a second resistor;

the first resistor is connected in parallel between two ends of the clamping diode; and the second resistor is connected in parallel between two ends of the second diode.

6. The boost power conversion circuit according to claim 2, wherein when the voltage control circuit comprises the controllable switching transistor, the voltage control circuit further comprises a controller, a first resistor, and a second resistor;

the controllable switching transistor is connected in series between the first diode and the second diode;

the first resistor is connected in parallel between two ends of the controllable switching transistor; and the second resistor is connected in parallel between two ends of the second diode.

7. The boost power conversion circuit according to claim 1, further comprising a first bus capacitor and a second bus capacitor; wherein the first switching transistor, the second switching transistor, the first diode, the second diode, the first bus capacitor, and the second bus capacitor form the second closed loop.

8. The boost power conversion circuit according to claim 7, wherein the controller is configured to: when the voltage on the input end of the boost power conversion circuit is less than the startup voltage of the boost power conversion circuit, control to close the third switching transistor; and the controller is further configured to: when the voltage on the input end of the boost power conversion circuit is greater than the startup voltage of the boost power conversion circuit, control to open the third switching transistor.

9. The boost power conversion circuit according to claim 1, further comprising a first bus capacitor, a second bus capacitor, a third bus capacitor, and a fourth bus capacitor; wherein the first switching transistor, the second switching transistor, the first diode, the second diode, the first bus capacitor, the second bus capacitor, the third bus capacitor, and the fourth bus capacitor form the second closed loop.

10. The boost power conversion circuit according to claim 1, wherein that the inductor, the first diode, and the second diode are successively connected in series to form the first branch and the first branch is connected in series to the input end of the boost power conversion circuit to form the main circuit includes:

a first end of the inductor is connected to the input positive electrode, and a second end of the inductor is connected to the first diode and the second diode that are successively connected in series.

11. The boost power conversion circuit according to claim 1, wherein that the inductor, the first diode, and the second diode are successively connected in series to form the first branch and the first branch is connected in series to the input end of the boost power conversion circuit to form the main circuit comprises:

a first end of the inductor is connected to the input negative electrode, and a second end of the inductor is connected to the first diode and the second diode that are successively connected in series.

12. A boost power conversion circuit control method, applied to a boost power conversion circuit, the boost power conversion circuit comprising:

a first switching transistor, a second switching transistor, an inductor, a flying capacitor, a first diode, a second diode, and a voltage control circuit; wherein the inductor, the first diode, and the second diode are successively connected in series to form a first branch, the first branch is connected in series to an input positive electrode and an input negative electrode of the boost power conversion circuit to form a main circuit, wherein an anode of the first diode is coupled to the input positive electrode of the boost power conversion circuit, cathode of the first diode is coupled to an anode of the second diode, and a cathode of the second diode is coupled to the input negative electrode of the boost power conversion circuit; wherein the inductor, the first switching transistor, and the second switching transistor are connected in series to form a first closed loop, and the first switching transistor, the second switching transistor, the first diode, and the second diode form a second closed loop; and one end of the flying capacitor is connected to a common point of the first diode and the second diode, and an other end of the flying capacitor is connected to a common point of the first switching transistor and the second switching transistor;

the voltage control circuit is connected in a third closed loop, the third closed loop is a loop comprising the inductor, the first switching transistor, the flying capacitor, the second diode, the input positive electrode, the input negative electrode, and the voltage control circuit coupled in series, wherein the voltage control circuit is configured to make a voltage borne by the second diode less than a bus voltage of the boost power conversion circuit, and the bus voltage is a voltage difference between a positive bus voltage and a negative bus voltage; and the voltage control circuit is configured to clamp a voltage of the common point of the first diode and the second diode when a voltage on an input end of the boost power conversion circuit is less than a startup voltage of the boost power conversion circuit;

wherein the method comprises:

when it is determined that a voltage on an input end of the boost power conversion circuit is less than a startup voltage of the boost power conversion circuit, controlling, by the voltage control circuit, a voltage borne by the second diode to be less than a bus voltage of the boost power conversion circuit, wherein the bus voltage is a voltage difference between a positive bus voltage and a negative bus voltage.

13. An inverter, comprising an inverter circuit and a boost power conversion circuit, the boost power conversion circuit comprising:

a first switching transistor, a second switching transistor, an inductor, a flying capacitor, a first diode, a second diode, and a voltage control circuit; wherein the inductor, the first diode, and the second diode are successively connected in series to form a first branch, the first branch is connected in series to an input positive electrode and an input negative electrode of the boost power conversion circuit to form a main circuit, wherein an anode of the first diode is coupled to the input positive electrode of the boost power conversion circuit, a cathode of the first diode is coupled to an anode of the second diode, and a cathode of the second diode is coupled to the input negative electrode of the boost power conversion circuit; wherein the inductor, the first switching transistor, and the second switching transistor are connected in series to form a first closed loop, and the first switching transistor, the second switching transistor, the first diode, and the second diode form a second closed loop; and one end of the flying capacitor is connected to a common point of the first diode and the second diode, and an other end of the flying capacitor is connected to a common point of the first switching transistor and the second switching transistor;

the voltage control circuit is connected in a third closed loop, the third closed loop is a loop comprising the inductor, the first switching transistor, the flying capacitor, the second diode, the input positive electrode, the input negative electrode, and the voltage control circuit coupled in series, wherein the voltage control circuit is configured to make a voltage borne by the second diode less than a bus voltage of the boost power conversion circuit, and the bus voltage is a voltage difference between a positive bus voltage and a negative bus voltage; and the voltage control circuit is configured to clamp a voltage of the common point of the first diode and the second diode when a voltage on an input end of the boost power conversion circuit is less than a startup voltage of the boost power conversion circuit;

wherein the boost power conversion circuit is configured to boost and then output a received voltage to an input end of the inverter circuit; and the inverter circuit is configured to invert, into an alternating current, a direct current output by the boost power conversion circuit.

14. The inverter according to claim 13, wherein the voltage control circuit comprises one of a clamping diode, a controllable switching transistor, and a compound component; and the compound component comprises the clamping diode and the controllable switching transistor that are connected in parallel.

15. The inverter according to claim 14, wherein when the voltage control circuit comprises the controllable switching transistor or comprises the compound component, the voltage control circuit further comprises a controller; and the controller is configured to: when the voltage on the input end of the boost power conversion circuit is less than the startup voltage of the boost power conversion circuit, control to open the controllable switching transistor; and the controller is further configured to: when the voltage on the input end of the boost power conversion circuit is greater than the startup voltage of the boost power conversion circuit, control to close the controllable switching transistor.

16. The inverter according to claim 14, wherein when the voltage control circuit comprises the clamping diode, the voltage control circuit further comprises a first resistor and a second resistor;

the first resistor is connected in parallel between two ends of the clamping diode; and the second resistor is connected in parallel between two ends of the second diode.

17. The inverter according to claim 14, wherein when the voltage control circuit comprises the compound component, the voltage control circuit further comprises a first resistor and a second resistor;

the first resistor is connected in parallel between two ends of the clamping diode; and the second resistor is connected in parallel between two ends of the second diode.

18. The inverter according to claim 14, wherein when the voltage control circuit comprises the controllable switching transistor, the voltage control circuit further comprises a controller, a first resistor, and a second resistor;

the controllable switching transistor is connected in series between the first diode and the second diode;

the first resistor is connected in parallel between two ends of the controllable switching transistor; and the second resistor is connected in parallel between two ends of the second diode.

* * * * *